US008631464B2

(12) United States Patent
Belakhdar et al.

(10) Patent No.: US 8,631,464 B2
(45) Date of Patent: Jan. 14, 2014

(54) METHOD OF DETECTING ANOMALOUS BEHAVIOUR IN A COMPUTER NETWORK

(75) Inventors: Omar Belakhdar, Chavannes (CH); Pedro Bados, Lausanne (CH); Boi Faltings, Preverenges (CH)

(73) Assignee: Ecole Polytechnique Fédérale de Lausanne (EPFL), Lausanne (CH)

( * ) Notice: Subject to any disclaimer, the term of this patent is extended or adjusted under 35 U.S.C. 154(b) by 1108 days.

(21) Appl. No.: 11/578,866

(22) PCT Filed: Apr. 19, 2005

(86) PCT No.: PCT/IB2005/001051
§ 371 (c)(1),
(2), (4) Date: Oct. 18, 2006

(87) PCT Pub. No.: WO2005/104482
PCT Pub. Date: Nov. 3, 2005

(65) Prior Publication Data
US 2007/0240207 A1    Oct. 11, 2007

(30) Foreign Application Priority Data

Apr. 20, 2004  (EP) ..................................... 04405242

(51) Int. Cl.
*H04L 29/06*         (2006.01)
(52) U.S. Cl.
USPC .................................... 726/3; 726/22; 726/23
(58) Field of Classification Search
USPC ........ 726/3, 12, 13, 22, 23, 25; 713/150, 153, 713/154, 162; 706/16, 22, 26, 31, 45, 46, 706/47, 48, 934
See application file for complete search history.

(56) References Cited

U.S. PATENT DOCUMENTS

| 6,158,011 | A |  | 12/2000 | Chen et al. |
|---|---|---|---|---|
| 6,735,703 | B1 | * | 5/2004 | Kilpatrick et al. ............... 726/23 |
| 7,000,154 | B1 | * | 2/2006 | LeDuc et al. ................. 714/47.2 |
| 7,307,999 | B1 | * | 12/2007 | Donaghey ...................... 370/465 |
| 2002/0046275 | A1 | * | 4/2002 | Crosbie et al. ................. 709/224 |
| 2002/0144156 | A1 | * | 10/2002 | Copeland, III ................ 713/201 |
| 2003/0046582 | A1 | * | 3/2003 | Black et al. .................... 713/201 |

(Continued)

FOREIGN PATENT DOCUMENTS

| EP | 1 054 529 A2 | 11/2000 |  |
|---|---|---|---|
| WO | WO 2005059720 A1 * | 6/2005 | ................ G06F 1/00 |

OTHER PUBLICATIONS

Lane et al., "An Empirical Study of Two Approaches to Sequence Learning for Anomaly Detection", Apr. 2003, Machine Learning, vol. 51, No. 1, pp. 73-107.*

(Continued)

*Primary Examiner* — Eleni A Shiferaw
*Assistant Examiner* — Hilary Branske
(74) *Attorney, Agent, or Firm* — Faegre Baker Daniels LLP

(57) ABSTRACT

Method of detecting anomalous behavior in a computer network comprising the steps of—monitoring network traffic flowing in a computer network system,—authenticating users to which network packets of the network traffic are associated,—extracting parameters associated to the network packets for each user, said parameters including at least the type (T) of network services,—forming symbols based on a combination of one or more of said parameters, and—modeling and analyzing individual user behavior based on sequences of occurrence of said symbols (S).

15 Claims, 13 Drawing Sheets

(56) References Cited

U.S. PATENT DOCUMENTS

| | | | |
|---|---|---|---|
| 2003/0074584 A1* | 4/2003 | Ellis | 713/201 |
| 2003/0110398 A1* | 6/2003 | Dacier et al. | 713/201 |
| 2003/0120935 A1* | 6/2003 | Teal et al. | 713/188 |
| 2003/0236652 A1* | 12/2003 | Scherrer et al. | 703/2 |
| 2004/0024769 A1* | 2/2004 | Forman et al. | 707/100 |
| 2004/0024864 A1 | 2/2004 | Porras et al. | |
| 2004/0083369 A1* | 4/2004 | Erlingsson et al. | 713/176 |
| 2004/0167893 A1* | 8/2004 | Matsunaga et al. | 707/6 |
| 2004/0205474 A1* | 10/2004 | Eskin et al. | 715/500 |
| 2005/0054327 A1* | 3/2005 | Johnston | 455/411 |
| 2005/0076237 A1* | 4/2005 | Cohen et al. | 713/201 |
| 2005/0091532 A1* | 4/2005 | Moghe | 713/201 |

OTHER PUBLICATIONS

Chung-Hsien Wu, Yeou-Jiunn Chen, Recovery from false rejection using statistical partial pattern trees for sentence verification, Speech Communication, vol. 43, Issues 1-2, Jun. 2004, pp. 71-88, ISSN 0167-6393, DOI: 10.1016/j.specom.2004.02.003.*

Lee et al., A framework for constructing features and models for intrusion detection systems. ACM Trans. Inf. Syst. Secur. 3, 4 (Nov. 2000), 227-261.*

Ge et al., Clustering Markov States into Equivalence Classes using SVD and Heuristic Search Algorithms, in C. M. Bishop and B. J. Frey (eds), Proceedings of the Ninth International Workshop on Artificial Intelligence and Statistics, Jan 3-6, 2003, Key West, FL.*

Fraser, Timothy, Badger, Lee, Feldman, Mark, "Hardening COTS Software with Generic Software Wrappers", Proceedings of the Foundations of Instrusion Tolerant Systems (OASIS'03), 0-7695-2057-X/03, 2003 IEEE.

Leblond, Eric, Deffontaines, Vincent, Desurmont, Xavier, "EFICAAS Project: Extending Firewalling Infrastructure Capabilities and Aggregating Authentication Systems", Mar. 12, 2002, XP-002335148.

Estevez-Tapiador, Juan, Garcia-Teodoro, Pedro, Diaz-Verdejo, Jesus E., "Stochastic Protocol Modelling for Anomaly Based Network Instrusion Detection", Proceedings of the First IEEE International Workshop on Information Assurance (IWIA'03), 07-7695-1886-9/03, IEEE.

International Search Report for International Application No. PCT/IB2005/001051 issued by the European Patent Office as the International Searching Authority dated Aug. 30, 2005.

* cited by examiner

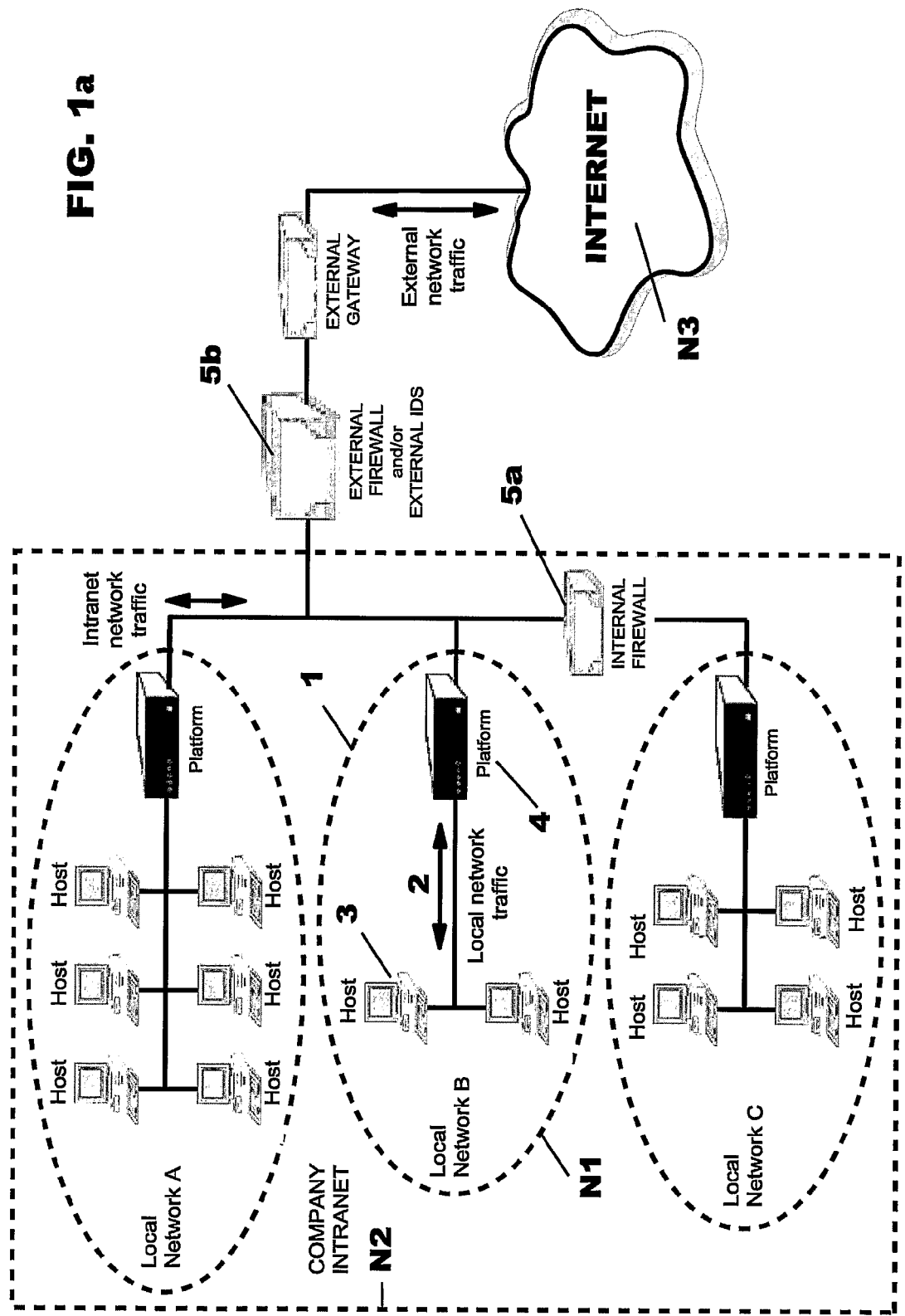

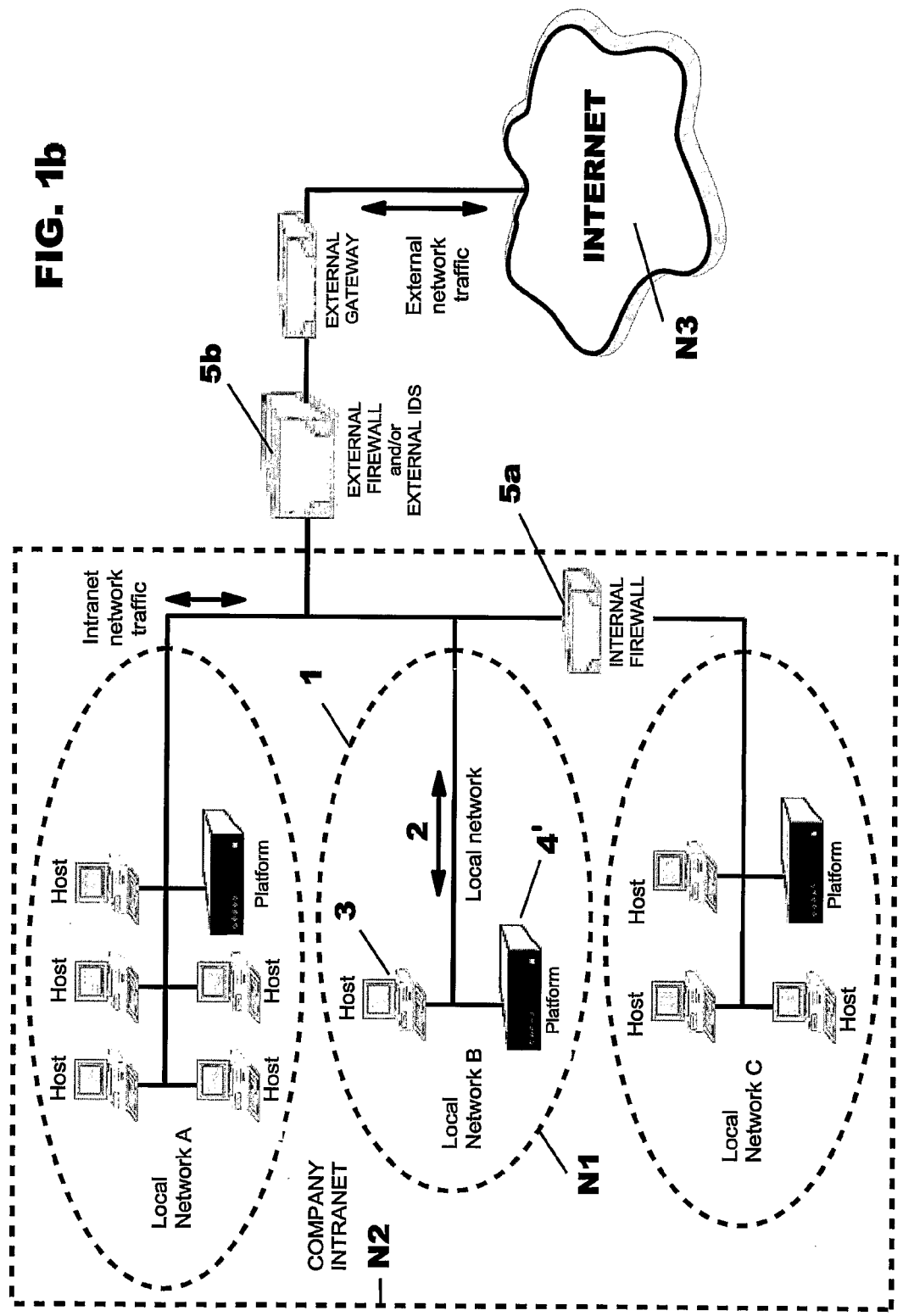

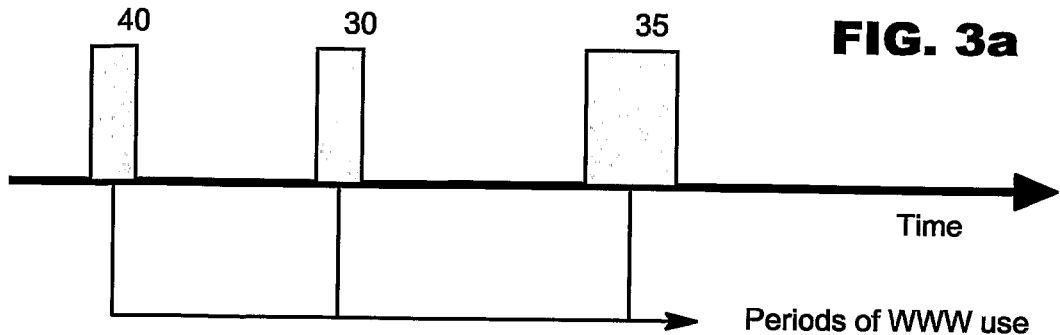
FIG. 3a
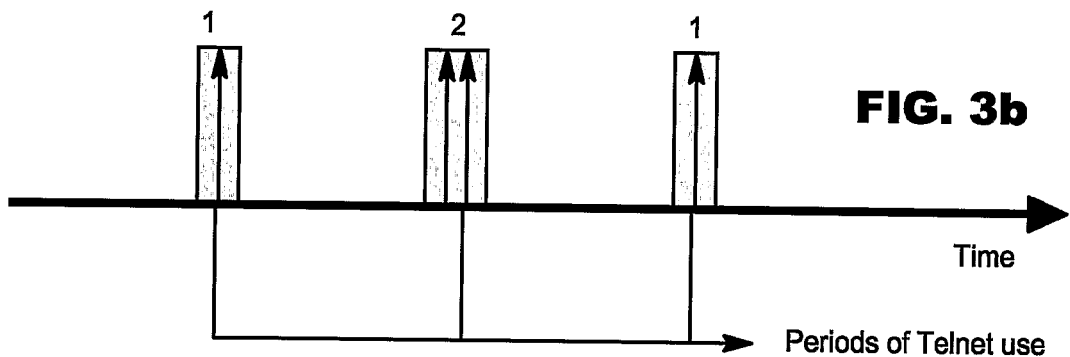
FIG. 3b
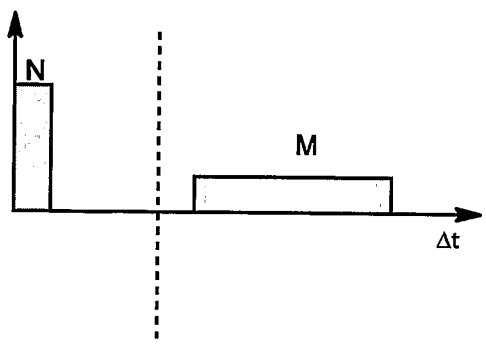 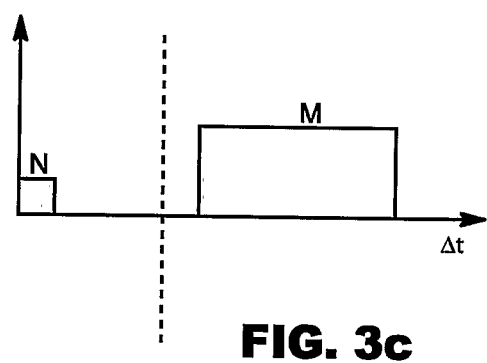
FIG. 3c

METHOD OF DETECTING ANOMALOUS BEHAVIOUR IN A COMPUTER NETWORK

The present invention relates to a method of detecting anomalous user behaviour in a computer network and an anomaly detection system (ADS) for implementation of the method. The invention falls within the general category of network based, anomaly detection systems.

An important field in which the detection of a anomalous user behaviour in computer network systems may be used, is the field of computer network security, in particular the detection of intrusion into a protected computer network system by unauthorized users, or privilege abuse, or unauthorized activities in a computer network system by legitimate users. The detection of anomalous user behaviour in a computer network system may also be useful for detecting system misconfigurations, or simply for controlling and monitoring user behaviour in computer networks.

Concerning the field of security, various intrusion detection systems (IDS) are available and may be generally classified as either host based or network based, or a combination thereof. Host based systems look at the information entering or exiting a physical computing entity (computer system), whereas network based systems look at the information flowing in a network.

In a host based system, information can be obtained from the host internal activities which provide a number of information sources that increase the quality of intrusion detection. They however have to be deployed at each host and are usually dependent on the operating system, which increases the cost of deployment. A further disadvantage is that if hackers manage to take over control of a host, they may be able to avoid or manipulate the IDS and the whole network is affected since the hacker may obtain an access point through such tampered host.

Network based IDS have fewer sources of information since they only look at the flow of information on the network, but they are easier to deploy since they do not need to be positioned at each host and are independent of the individual host operating systems. They are also more difficult to notice and avoid or to be manipulated by a hacker.

Both types of IDS may be deployed in a computer network system since they are not mutually exclusive, although overall efficiency may not be improved.

The known methods of detecting malicious activity may be broadly classified into two types.

The first type of intrusion detection is based on surveillance of network information flow and identification of information patterns corresponding to patterns that are known and predefined and that correspond to malicious (or conversely normal) activity. This technique has the advantage of being fast, but has the disadvantage of not being able to detect unknown patterns resulting from new types of attacks.

The second type of detection is based on detecting abnormal behaviour, which requires some sort of modelling of "normal" behaviour and a comparison of the real behaviour on the computer host or in the network with the model of normal behaviour. While such methods are better adapted to detect new (unknown) types of attacks, the difficulty of defining and modelling "normal" behaviour, further taking into account user habits, hosts, services, protocols variations, mean that it is very difficult to reduce the high false positive alarm rate, while maintaining reliable intrusion detection (i.e. low false negative alarm rate). In order to improve detection of malicious behaviour, it is known to apply machine learning techniques to model and modify over time the parameters defining normal behaviour as compared to abnormal behaviour.

Modelling behaviour is usually based on statistical profiles or probabilities (for example using bayesian networks) based on various features of network traffic, such as data transfer volume, number of erroneous correction requests, nature of erroneous correction requests, and ports to which connections are attempted (e.g. see WO 02/19077 A2, or U.S. Pat. No. 6,484,203 B1).

One of the main weaknesses of conventional network based IDS's is that they do not identify users nor application binaries associated with the connections and are thus unable to model separately each individual user and application behaviour.

It may be remarked that the above two methods of detection are not mutually exclusive and can therefore both be implemented in a hybrid method.

An object of the invention is to provide a simple and reliable method and system for identifying and authenticating individual users in a network, particularly for use in a network based anomaly detection system (ADS).

Another object of the invention is to provide a method of detecting anomalous activity in a computer network, and an anomaly detection system (ADS) therefore that is reliable, in particular that eliminates or minimises false negative alarms and false positive alarms.

A specific aim of the invention is to provide a method of detecting intrusion by an unauthorized user in a computer network, or malicious or unauthorized activity by legitimate or illegitimate users in a computer network, that is reliable, in particular that it eliminates or minimises false negative alarms and false positive alarms, and that is capable of detecting unknown types of attacks.

It is advantageous to provide an anomaly detection system that is easy to deploy with different operating systems It is advantageous to provide an anomaly detection system that is difficult to detect and that is impossible to avoid or manipulate.

It is advantageous to provide an anomaly detection system that is easy to use, in particular that provides a graphical interface that is easy to read and understand, for a system administrator.

Objects of this invention have been achieved by providing a method of detecting anomalous activity in a computer network according to claim 1 and an anomaly detection system (ADS) according to claim 12.

Disclosed herein is a method of authenticating users in a computer network in which network packets are transmitted, using an authentication module, including the steps of receiving kernel events requesting a connection, modifying the kernel events, transmitting the modified kernel events to a kernel of the operating system, generating connection and authentication information in the kernel, sending authentication packets with the authentication information and connection request packets.

The authentication packets, which may for example be in the form of enhanced UDP packets, may advantageously comprise fields identifying the connection and the user, as well as a field identifying the application. The identification of both the user and the application is particularly useful for modelling the behaviour of the individual users in a network and detecting anomalies in individual behaviour. The authentication packets may further comprise a process identification field and an application binary checksum field to verify binary integrity of the packet.

An advantageous feature of the invention is the authentication of the binary applications causing the network activity. This information associated with the user identification, may be a very useful parameter in modelling user behaviour.

Also disclosed herein is a method of detecting anomalous user behaviour in a computer network comprising the steps of:

monitoring network traffic flowing in a computer network system, authenticating users to which network packets of the network traffic are associated, extracting parameters associated to the network packets for each user, said parameters including at least the type (T) of network services (for example smtp, www, telnet, . . . ), forming symbols based on a combination of one or more of said parameters, and modelling and analysing individual user behaviour based on sequences of occurrence of said symbols (S).

The extracted parameters may further include the application binaries associated with the connection request, the network being addressed by the user (for example internal, external) which may be derived from the connection destiny address, the frequency (number of connections in a service) and duration (time between first and last connection in a service). Parameters may further include the time interval between connections, and the number of bytes, the period of the day (e.g. morning, afternoon, evening, night).

The aforementioned parameters may be combined to form a symbol, each different combination forming a different symbol. The model of "user behaviour" may be obtained by modelling the sequence of symbols using the technique known as "Hidden Markov Models" (HMM), or by using other known techniques as dynamic bayesian networks employed in machine learning techniques.

An important difference between the invention and existing network based intrusion detection systems resides in the separation of network packets (connections) as a function of the user identity and the modelling and analysis of the behaviour of each individual user of the network. It may be noted that in the prior art, the term "user" is either meant generally or is related to a source host. Whereas in host based IDS, user identification is implicit, this is not the case in network based IDS, since the network traffic per se does not identify the individual user. The concept of modelling in realtime each user behaviour in a network with a network based anomaly detection system is thus significantly less evident than modelling user behaviour on a host based IDS.

It may be noted that the creation of symbols and their sequential analysis with HMM enables changes in behaviour to be modelled and thus taken into account and provide for the possibility of comparing new behaviour with modelled behaviour by probabalistic determination of the symbol sequence.

A premise of the invention is that Users operate in network systems guided by certain aims such as working on software projects, checking email, or surfing on the internet. These activities involve an exchange of information through the network, using Services by means of connections in certain protocols. It is also assumed that there is a high level of correlation or specificity between aims and services. It is really difficult to use a certain service for two completely different goals. The set of actions in terms of sequence of services will define the user behaviour.

The invention IDS relies on two important consequences of the aforegoing premises. User behaviour is a priori unknown to the intruder, but assuming the intruder knows how to model User behaviour by observation, a learning process must be applied which requires time and is complex. Even if the intruder knows how to model User behaviour of a legitimate user, in conformity with the modelling performed by the invention IDS, the intruder must adopt a similar behaviour. This fact will significantly limits the possibilities of attacking the network system undetected since the service goals are somehow linked to the aims. The intruder is restricted to a set of possible actions similar to those of the legitimate user who has no aim of attacking the system. Therefore, malicious activity on the network under guise of the legitimate user becomes very difficult.

An important advantage of the invention over existing IDS is that it not only detects intrusion by an unauthorized user into the protected network, but also reveals abnormal use by authorized users who may be abusing their privileges in the network system or performing unauthorized activities. The term "intrusion detection" within the context of the present invention thus has a broader meaning than what is usually understood by the term in the prior art, since it also concerns the detection of abusive or unauthorized use by legitimate users of the protected computer network system.

The anomaly detection system according to the invention also has applications outside of the field of computer network security, since the detection of anomalous behaviour can also be used to detect system misconfigurations or simply changes in the behaviour of users that may apply to a variety of applications outside of the domain of securizing the computer network. The anomaly detection system according to this invention is thus very advantageous over existing systems that are usually very specific and do not have the versatility to allow their use in multiple applications.

Further advantageous aspects of the invention will be apparent from the claims and the following detailed description of the invention, with reference to the figures in which:

FIG. 1a is a schematic representation of the architecture of a computer network system in which the invention ADS is deployed;

FIG. 1b is a schematic representation of the architecture of a computer network system in which the invention ADS is deployed according to another embodiment;

FIGS. 3a and 3b are graphical representations of the number of connections in each interval of use of www (world wide web), respectively telnet connections by way of example only;

FIG. 3c shows graphical representations of the number of connections as a function of time for different types of services;

Figure 2A:
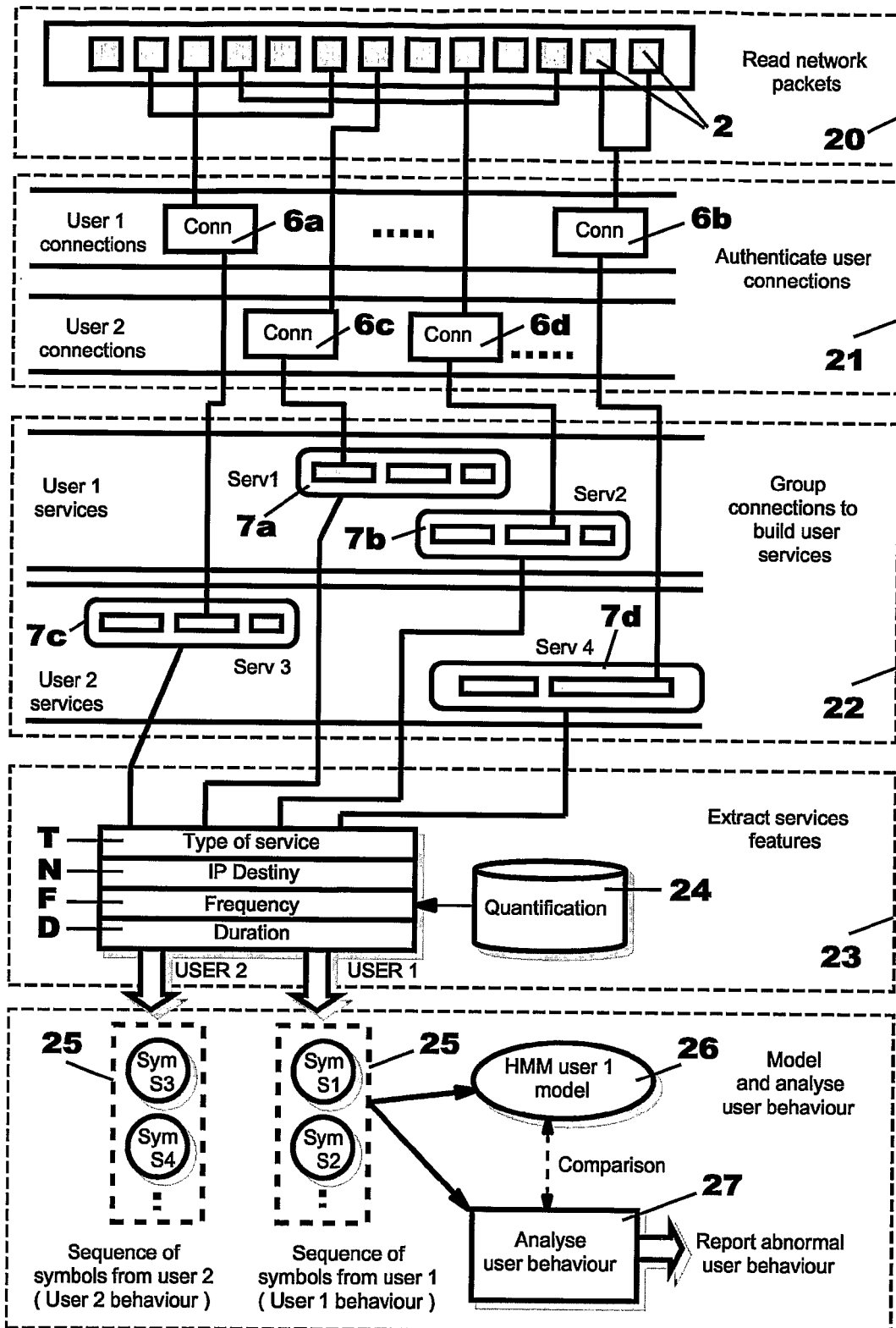
FIG. 2a is a schematic representation of the general steps of the method of detecting anomalous activity in a protected computer network according to this invention.
Figure 2B:
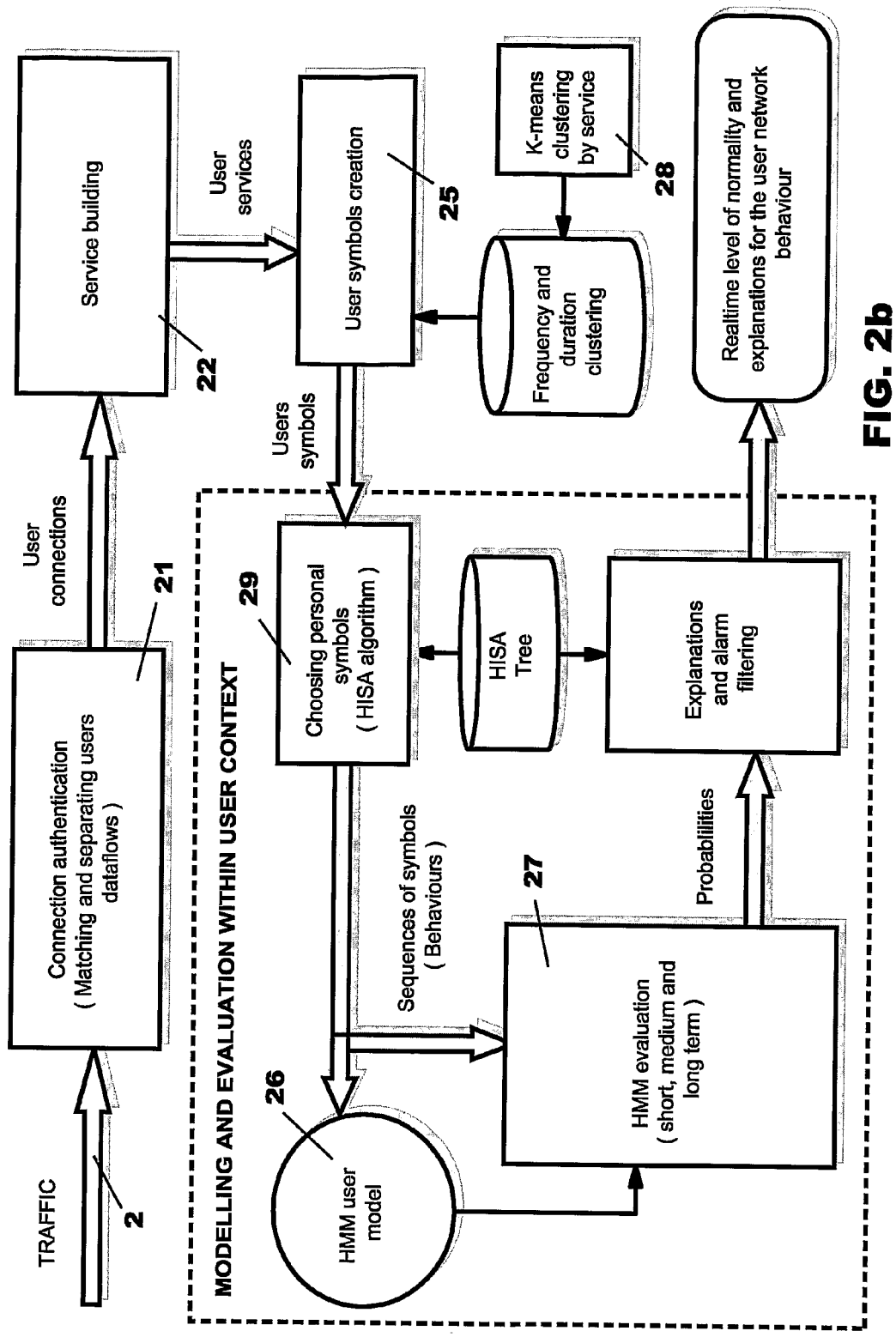
FIG. 2b is a flow chart diagram illustrating operations performed in the method of detecting anomalous activity in a protected computer network according to this invention.

Referring to FIGS. 1a, 1b, 2a and 2b, the overall architecture and general steps in the method of detecting anomalous behaviour according to the invention will first be described very generally before going into the details. The ADS according to this invention is deployed in a protected (or internal) network N1, which may for example be a local network within a company intranet N2, in such a manner that it can read 20 all the network packets 2 flowing in and out of the local internal network N1 to the network hosts 3. An authentication module of the ADS, installed for example as shown in FIG. 1a in an ADS work station 4 behind internal network firewalls 5a and/or external firewall 5b, monitors all User connections 6a, 6b, 6c, 6d, and identifies and authenticates the personal user (User 1, User 2, . . . ) associated with each network packet 2 transmitted and received. The ADS may also advantageously authenticate the application binaries associated with the User connections.

In the embodiment shown in FIG. 1b, the ADS platform 4' is located as a network end-point. The authentication packets are directly routed to the platform instead of passing through it as in the case of inline systems shown in FIG. 1a.

This deployment mode provides a simple way of monitoring and detecting abnormal events over the system without needing to extract or analyze the whole network information flow from routers or inline appliances, thus simplifiying implementation of the ADS.

Network packets belonging to a specific User are processed 21 and grouped to build 22 connections 6a, 6b, 6c, 6d which create Services 7a, 7b, 7c, 7d that represent the different network activities of the specific Users (User 1, User 2), for example surfing on the world wide web (www) or downloading software with a telnet connection.

Parameters of the Services, in particular the Type of service (T), the IP group or network (N) addressed by the Service, the frequency of the connections of the Service (F) and the duration of the service (D), are extracted 23, quantified 24, and combined 25 in order to build Symbols (S). Application binaries obtained during the connection request by an authentication module may also form parameters included in the building of Symbols, so that the modelling of user behaviour takes into account the application being used. Even though application binaries have not been specifically mentioned in the examples described below and illustrated in the figures, they may of course be included in the combination of parameters forming the symbols, as an additional parameter or in replacement of one of the parameters mentioned in the examples.

The sequence of occurrence of Symbols (S1, S2, . . . ) for a specific User is a representation of the User's behaviour that may be modelled 26, during an initial learning period, and subsequently analysed 27, by comparison with the model, by using machine learning algorithms, such as Hidden Markov Models (HMM). Various aspects of the behaviour of users in different temporal terms may be represented graphically and textually in different fields on a graphical user interface (GUI) for interpretation by a system administrator, and alarms may be generated for user behaviour that deviates beyond a certain threshold from the modelled behaviour for that User.

Details of the various steps of the ADS deployment according to this invention will now be described.

In the present, a real connection is considered to be any exchange of information in a network, for example an IP (Internet Protocol) network, between hosts through a known and standard protocol, for example TCP (transmission control protocol) connections. The attempt of establishing a connection will be considered a connection. A Host is considered to be any single active element on the network, potentially able to initialize physically a real connection with any other hosts.

Normally hosts are computers with several OS (operating systems) but also routers with certain functionalities could be hosts. A User is considered to be the same as the one defined and generally used by operating systems. Normally, for most users this criteria is by personal accounts excepting special cases as root or specific missions such as daemons where the administrator may be consider interesting to group more or split one into several users. The UID is the user identification number associated to a specific username. Every process running within any operating system (OS), including UNIX, Mac or Windows-based systems, is necessarily linked to a user context and therefore to a specific UID. Often the UID represents a certain account for a physical user but occasionally there are some standard accounts for OS services and applications with no direct link with human operation.

In the present, a Service is considered to be a group of real connections with a high similarity and sharing the same or a similar aim, as will be described in more detail hereinbelow. Due to TCP protocol nature, the real connection itself is a too small piece of behaviour to model comfortably. Some concrete exchanges of information require a number of connections. Therefore real connections in services attempting to fuse similar events which obey to the same aim of information exchange are regrouped and define a Service. Since aims are abstract, they are difficult to model and translate into services. It is not a big loss to consider two sub-aims instead of a more generic one since they will be always identified, modelled and analysed in the same way and there is no direct influence between them. However, mixing up two different motivations in one service can be more dangerous since one of them could somehow hide the goal in the other. Therefore, in the invention method, care is taken to avoid merging different aims into a single service.

In view of the large amount of information in network traffic, in order to extract properties thereof, it is important to organise and compact the information into simple and easily workable structures without an appreciable loss in information important for security. The latter is achieved in the present invention by the reorganisation of network traffic as Services associated to each User, as will be described in more detail hereafter.

In the process of capturing the information one obtains a large sequence of network packets 2 in a certain protocol. Packets from the network are extracted and reassembled in order to build connections 6a, 6b, 6c, 6d guided by the network protocols. Then, the connections are grouped forming services 7a, 7b, 7c, 7d by seeking to keep in a service the same aim of usage for the whole set of connections, for example using data mining techniques from the structure and temporal point of view. Parameters of or associated with the Services are then extracted, quantified if necessary and finally combined to form entities that are defined herein as "Symbols" S which will then be used in User behaviour modelling.

As a result of using certain network protocols, one usually establishes many connections. If one takes into account all of them, some important information about the global sense of the set of symbols could be missed as well as overloading the modelling with a large number of similar symbols with a common goal. Suppose one receives a sequence of connections smtp; telnet; www; www; ... 30 times www ... ; ssh. To evaluate properly the service information it is possible to regroup the set of similar connections into services instead of individually evaluating each connection. For instance, the sequence shown before can be analysed in terms of the Services smtp, telnet, www, and ssh. The reason to operate like this resides in the habitual usage of some services, which sometimes generate burst traffic, i.e. a set of connections very close in time. This property is primarily due to the nature of some service as in www (world wide web). However, it does not mean than two consecutive and similar services cannot be observed together, naturally it may happen but in the former example each of them must be considered separately.

The number of connections in each service interval will be named frequency F. By way of example, as illustrated in FIG. 3a, each time a user establishes a www service he generates many connections. One can consider this burst traffic to form only one service. For instance, the forty www connections can be interpreted as a single www service. However, this is not the case for some other services. For example, referring to FIG. 3b, it may be noted that TELNET usage is different since it is normally formed by a single connection and occasionally by two. Therefore, a very important issue is determining a good method to create services from these rows of connections which involves the evaluation of the time intervals between them in order set proper thresholds. Time periods between services are much longer than the ones between connections in each burst. If one displays a time between connections graphic as illustrated in FIG. 3c, one observes how the threshold location is not difficult to determine. For instance, in www burst traffic one usually deals with situations as illustrated in FIG. 3c. One may observe how the delay is much longer between different services. Moreover, connections with a short delay will be quite habitual. On the other hand, in services where there normally is a single connection such as TELNET, longer delays between connections are observed. For other services where the delays are less predictable, statistical methods may be used to determine the thresholds.

The following algorithm may be used to separate connections into services coming from a specific user. A connection driven closing method is used to avoid timers when many services are open. Although it produces open services in intervals where they should be closed, this fact is not important since they will not affect incoming new connections.

---

Algorithm 1 (to create services)

---

1: user←UserOf(conn)
2: for all s←OpenServices(user) do
3:      if state(s) = OPEN then
4:          if CheckServToClose(s) then
5:              CloseService(s)
6              continue
7:          end if
8:          if ConnBelongsToServ(conn; s) then
9               AddToService(s; conn)
10:         end if
11:     end if
12: end for
13: OpenNewService(conn)

---

The criteria applied, as shown in algorithm 2, to assign a new incoming connection belonging to an open service, consists on evaluating whether the service comes from the same system as the open one does, and whether their main aims (assumed as destiny host and port) are also similar. It is a simple procedure but enough to achieve the necessary fusing rate to operate with services without missing critical information in the user motivations. The criteria of using the port to represent a similar kind of connection can be replaced by other elements, particularly those used in other protocols. Moreover, several TCP ports can be merged in a single one from this algorithm's point of view.

---

Algorithm 2 (belonging to service criteria)
function BelongsToService(c; s)
return (shost(s)=shost(c)∧dhost(s)=dhost(c)∧dport(s)=dport(c))

---

After some inactivity time, services are closed and it becomes necessary to open a new one if new connections arrive. The closing is carried out by the method presented in algorithm 3. The TIMEOUT function determines the maximum interval between similar connections within a common service. In practice it can be set for example to around 30 seconds since this suffices to complete an aim of connection. Statistical methods may also be used to set the specific thresholds for each service.

---

Algorithm 3 (Closing service criteria)

---

1: function CheckServiceToClose(serv)
2: if TimeInactivity(serv)<TIMEOUT(serv)) then
3:      return OPEN
4: end if
5: for all connserv do
6:      if state(conn)=OPEN then
7:          return OPEN
8:      end if
9: end for
10: return CLOSE If all the connections within a service have finished, the service must remain open for a TIMEOUT. This interval, as was commented above, can be either fixed or calculated by a statistical representation of the connections intervals involved in such service.

Parameters that characterise network packets, and that may be incorporated in symbols used in modelling and analysing user behaviour are related to the services and include: 1) the type of service T, 2) the IP group N, 3) the frequency of connections F and 4) the duration between services D. The first two (T,N) can be determined at the moment the first connection is detected, whereas the latter two parameters will have different and continuous variable values. In order to reduce the time to alarm, certain thresholds for parameters available first may be applied before waiting until the end of the service to signal an anomaly. Since the different parameters may have many possible values, even infinite as in the case of continuous variables, a quantification method to group the services is required.

Other parameters useful in the modelling of user behaviour may also be extracted, such as the time of the day and number of bytes.

The type of service may be derived from the port destiny in the service, for example the TCP port. Since the nature of each service related to TCP ports is very different with the exception of some special cases, the type of service may be quantified by assigning a different value for each different port. In other protocols, other criteria may be used for defining the type of service.

The IP group is determined by splitting IP destinies into different sub-networks. Although a user normally connects to several IP addresses, in order to reduce the dimension of states, the IP addresses may be classified into a few logic network sets, for instance corresponding to a VLAN division. However, the normal way of grouping the IP addresses will be by defining the notion of security levels. By way of example, one may assign three different values to the following three IP groups, as illustrated in FIG. 1:

1. Value N1 for the IP group inside the local router.
2. Value N2 for the IP group outside the local router but inside the company exterior gateway.
3. Value N3 for the IP groups outside the company exterior gateway.

It may be remarked that from the security point of view, it is the same if one establishes a connection to any external IP address, so they may be grouped as a single value.

This classification is based on simple network topology, but other implementations to classify host groups with a higher level of knowledge can also be used, for example based on LDAP (Lightweight Directory Access Protocol) source of information.

The frequency parameter F indicates the number of connections in each service. Even a low frequency of connections, for some types of services, may be a sign of malicious activity. For instance, it could represent a password guessing attack or a buffer overflow exploit repeated with several magic shell strings. Since frequency is a continuous variable, a special method of quantification is required, as will be described in more detail hereinafter.

The duration of the service parameter D is defined as the time between the first connection and the end of the last one in a service. As in the case of frequency, duration for some services may also be an important factor to classify, but for some others it may be a less useful highly variable source of information. The quantification of duration also requires a special method as will be described below.

Effective methods of quantification should not lose critical security information, while reducing potential values from a large set into a just a few classes. It is preferable to avoid forming groups with a similar probability of occurrence because the sum of many rare events could be hidden in a highly likely or normal class.

Two alternative methods of quantification 24 of the continuous variable parameters, frequency F and duration D, are proposed herein: fixed-step quantification and k-means clustering 28. For ease of understanding, we will assume in both cases the simplest situation with only two classes: abnormal events, i.e. low occurrence rate events, and normal events, for all others.

Figure 4A:
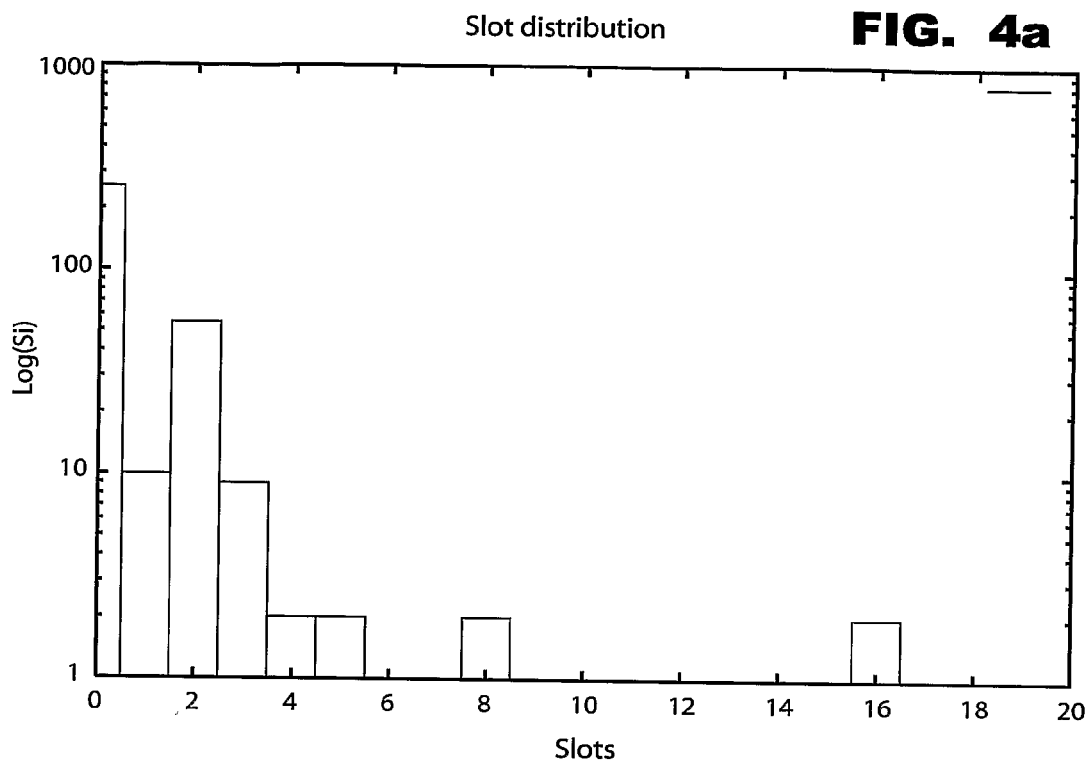
FIG. 4a is a graphical representation of the distribution in a division of twenty fixed steps of 338 services with a maximum duration of 2048 seconds, by way of example only.

The Fixed-step quantification algorithm is based on splitting the continuous range into a number of fixed steps. Depending on the quantity of events in each range, they will be labelled as normal or abnormal. This method comprises the following steps:

1. Divide the continuous range in little and numerous slots. Assume a division with N slots. This value will have a strong dependence with the amount of training sets.
2. If there are S samples of the variable and if one assumes a uniform distribution, one has in each slot S/N samples.
3. If $s_i$ for i=1 . . . N is the number of real samples in each slot i, normality may be defined as $n_i = s_i/S/N \in [0; N]$.
4. The set of abnormal variables are grouped as normal or abnormal depending on whether they are over or under a certain threshold T of normality level. Using several thresholds one could create more than two categories sorted by the normality factor. The value of T should be fixed under 1 which is the average, to achieve a good classification between low occurrence rate events and the rest. Note that the motivation behind this simple procedure is only to avoid hiding information with the quantification. If a class is numerous and T is not low enough, there may be a loss in accuracy. In the worst case, where n is equal to T, one has a low-rate symbol with $$S_{lr} = (N-1) \times T \times S/N \approx T \times S$$

and a symbol with normal and high rate with $S_{nhr} = S - S_{lr} = S \times (1-T)$. Although this critical situation is unlikely to occur, one should take care in setting the value of T as well as of the different thresholds in order to assure a correct abnormal symbol. By way of example, consider the quantification of the duration of port 80 symbols based on data where S=338 services and the maximum duration is 2048.21 s. If we choose for instance N=20 slots, we have the distribution in slots shown in FIG. 4*a*, where the Y axis values are logarithms.

Here, we can observe how in this particular case most services have a low duration so the events are concentrated in the first steps. Some special cases as slots 4,5 or 16 show strange durations for this service. If the normality value for each slot is calculated and compared with a threshold T=0:2, one obtains the values shown in table 1 herebelow.

TABLE 1

| Slot | Number of samples $S_i$ | $n_i = \dfrac{s_i}{S/N}$ | Normal/Abnormal, < > T ? |
|---|---|---|---|
| 0 | 256 | 15.147 | Normal |
| 1 | 10 | 0.591 | Normal |
| 2 | 55 | 3.254 | Normal |
| 3 | 9 | 0.532 | Normal |
| 4 | 2 | 0.118 | Abnormal |
| 5 | 2 | 0.118 | Abnormal |
| 6 | 0 | 0 | — |
| 7 | 0 | 0 | — |

TABLE 1-continued

| Slot | Number of samples $S_i$ | $n_i = \dfrac{s_i}{S/N}$ | Normal/Abnormal, < > T ? |
|---|---|---|---|
| 8 | 2 | 0.118 | Abnormal |
| 9 | 0 | 0 | |
| 10 | 0 | 0 | |
| 11 | 0 | 0 | |
| 12 | 0 | 0 | |
| 13 | 0 | 0 | |
| 14 | 0 | 0 | |
| 15 | 0 | 0 | |
| 16 | 2 | 0.118 | Abnormal |
| 17 | 0 | 0 | |
| 18 | 0 | 0 | |
| 19 | 1 | 0.059 | Abnormal |

As can be seen in the table, the two classes are $S_{nhr}$=319 (94:3%) and $S_{tr}$=9 (5.7%).

It may be remarked that the absolute number of classes as well as the values of the parameters T and N will influence the model accuracy. The election for these parameters should therefore be mainly based in the training set and other considerations extracted from the likelihood density function.

The second method proposed to quantify continuous variables such as frequency and duration is a clustering approach based in a simple k-means algorithm. The main idea behind this method is basically building regions of normality. The frequency and duration samples form some intervals where the occurrence is more likely. Since different number of clusters can be chosen, several regions may arise in the distribution. Once the clusters are stable, when new instances arrive, their exact location measured by the distance to the nearest cluster center, may indicate the degree of anomaly. Therefore, choosing one or more thresholds for this distance, one could classify them more or less normal. The clusters building and distance evaluation are simultaneously performed with any new incoming instance. The clusters will not be user dependent mainly due to two reasons: (i) Experimental work shows a certain independence of service frequency and duration with respect to the user. However, both variables seem to have a high degree of dependence with the type of service. (ii) The necessary number of samples to train an accurate cluster system for each type of service is high. If one waits for each user to have all of the services samples, the learning period may become long. Therefore, in a user independent approach, every sample for the same type of service coming from any user will be included in the same cluster.

Although the clustering is common for every user, the posterior application of this continuous variable for each model will be user dependent.

The number of clusters is in practice usually low. For services that have fairly constant values for duration and frequency, a few clusters suffice to model the behaviour. However, in other cases where the instances are widespread, it is not useful to cover them with several clusters since frequency and duration information will not probably be taken into account as strange events.

To measure the distance to the cluster, we could evaluate the euclidean distance normalized to the cluster variance. This value is calculated by the Mahalanobis distance defined as: $d(x)=(x-\hat{x})^2/\sigma^2$. Using the variance as a normalization factor improves and reinforces the decision when we have few instances within the cluster. Moreover, the Mahalanobis distance enables us to compute the cluster in different temporal and frequency scales depending on how spread the instances are.

Figure 4B:
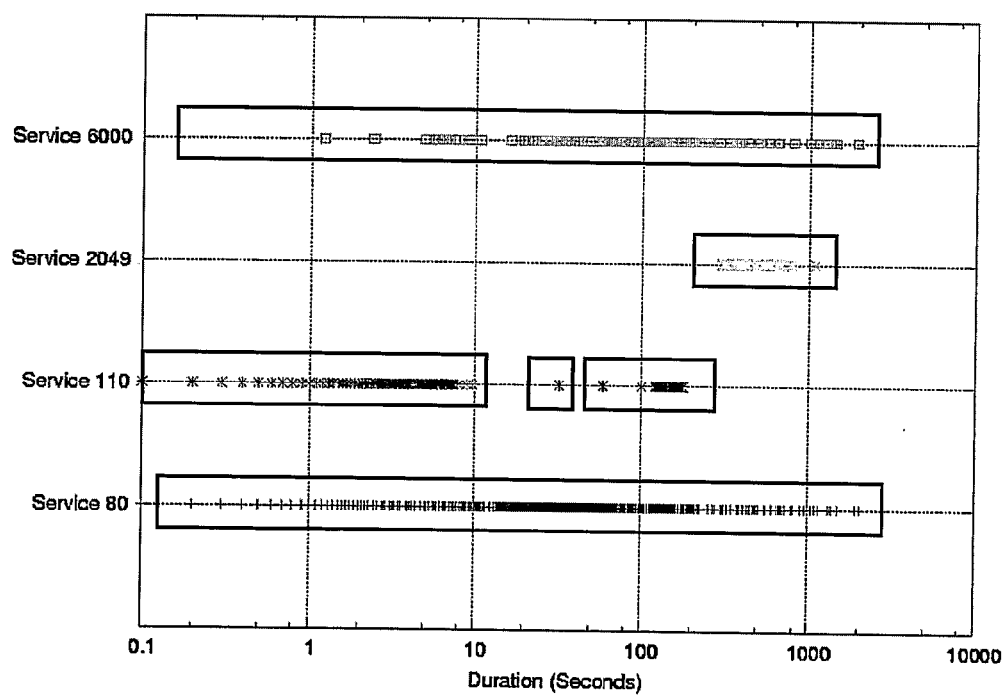
FIG. 4b is a graphical representation of the duration distribution and clusters of an example of use of four services, using a K-clustering algorithm.

FIG. 4b shows the clustering results in four services for duration and frequency. The clusters created are represented by the grey bands. It is interesting to note how some services contain fixed intervals which produces concrete and small normal regions. Some examples of this phenomenon can be observed in service 2049 for the duration or port 110 in the frequency. On the other hand, some cases as duration distribution for port 80 (web services) have wide range of possible values spread in the time line which makes them irrelevant to further analysis. Therefore, in those situations the normal region corresponds to a large temporal interval.

In the example illustrated, the set of four values corresponding to the type of service, network, duration and frequency form a symbol. By way of example, consider a system with the following quantification parameters:

Service: Each different service is a type $S_i$, where i=0 ... m, where m is the maximum number of possible services.

Network: IP destinies are classified as $N_i$ or $N_e$ if they are internal or external respectively.

Frequency: The number of connections is classified as $F_n$ or $F_a$ if they are normal or not by the method explained above Duration: The service duration is classified as $D_n$ or $D_a$ if they are normal or not by the method explained above The service symbol SY of a new service going towards the port 80 of an external host, with normal frequency and abnormal duration, is the union of the four values $SY=S_{80}N_eF_nD_a$.

Once all the symbols from the program training period for a user have been created, one possible and advantageous pre-process 29 is based on reducing the number of different symbols by selecting the most suitable for modelling and analysing behaviour. This reduction may be performed by means of an algorithm, called herein HISA (high importance symbol algorithm), that balances the following aspects:

(i) a very high number of different symbols generates a more complex model since more different events are included. It can produce a certain noise since every different symbol is modelled, even if all are habitual and very similar. Moreover, to achieve a trained model, one may need a good representation, i.e. good training, of the elements of each class which requires more time. The fusion approach enables us to merge similar and habitual symbols improving the training and reducing the noise. There is however a certain danger in losing or hiding information in such fusions so one must evaluate the situation and select the most likely symbols to be merged.

(ii) a very low number of different symbols produce too generic models. Since having too few symbols makes the analysis of sequences less detailed and also misses some not so normal symbols, in these cases the detection accuracy may decrease.

A computer network system security administrator will judge each feature with different importance and depending on their habitual range, will select the key parameters to discover abnormalities. For instance, when one observes symbols where the network feature is not important since the connections are frequent for every IP group value, the network feature may be disregarded. Irrespective of such omissions, the order of decreasing importance of the four parameters described above is considered to be:

1) the type of service T
2) the network (IP source or destiny N); and
3) frequency and duration F, O.

If the parameters include period of the day and bytes, the preferred hierarchy is as follows:
1) Type of service.
2) Network.

3) Period of the day.
4) Frequency, duration, number of bytes.

This classification does not mean that the low level features are not useful to detect attacks, rather, they should be considered in the context of the higher level factors. For instance, a high single frequency value does not give us any information since its context must include the service and network.

The importance of symbols may be quantified as a parameter i for use in modelling behaviour. Reasons to include a symbol in the model can differ, in particular, some services may be more critical from the security point of view than others. For reasons of simplicity, we shall however consider in the following description that all symbols represent a similar degree of potential risk. Therefore, their importance will be defined in terms of importance for the modelling user behaviour, which we can consider to be the number of occurrences in the User's period of training. The importance parameter i thus corresponds to the number of times each symbol appears in the training period.

Figure 5A:
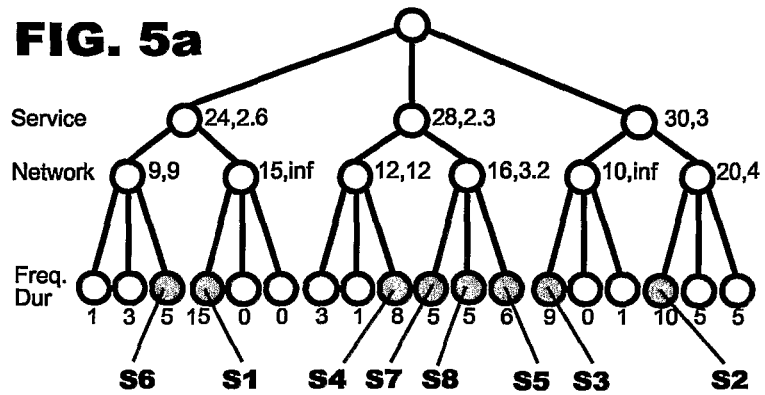
FIG. 5a is a schematic representation of an example of a hierarchical tree of symbols formed of the parameters type of service, type of network, frequency of connections in a service, and duration of connections in a service, whereby the shaded circles represent the eight symbols with the highest importance value.

The HISA algorithm seeks to reduce the number of symbols for modelling behaviour guided by the importance factor, here the number of occurrences. Consider the four service properties P={T; N; F; D} (where T is the type of service, N the network IP group, F the frequency and D the duration) classified in the three levels of importance mentioned above. The highest level includes generic symbols for each type of service (any value in N, F and D). The second level involves each pair type-IP group (any value in F and D) and the third level corresponds to real observed symbols with the four properties. Each new symbol is assigned to three nodes, one of each level, but only the one in level 3 involves the same four characteristics. For instance, FIG. 5a shows a possible hierarchy where 82 symbols have been positioned in a symbol hierarchy tree assuming that there are three types of services, and two types of networks (internal, external) and three possible combinations of frequency and duration.

Regarding the importance i, for instance the number of occurrences, there are two main reasons to reduce the number of symbols. Firstly, models of complex users with a large number of symbols are difficult to train, resulting in difficulty in recognising the authentic user. Secondly, fusing symbols enables non-valuable features to be discarded. For instance, for some services the IP group may be irrelevant. It is important to note that if the administrator chooses other considerations to set importance i, the values based on considerations not retained will be discarded to improve the detection of what fits the administrator's interests.

By way of example, let us fix the number of desirable and observable symbols in the model to S+1. The HISA algorithm described below is used to fuse the total number of symbols until reducing them to choose S (the one missing is the sum of the rest) or reaching a point where more fusions are not possible.

| HISA algorithm |
| --- |
| 1: candidates←BuildTree(samples) |
| 2: CalculateRates(candidates) |
| 3: repeat |
| 4:     selected←smallest(S; candidates) |
| 5:     rest←mpop(candidates; selected) |
| 6:     Ms←min(selected) |
| 7:     R←sum(rest) |
| 8:     if R ≤ Ms then |
| 9:         return selected |

| HISA algorithm |
| --- |
| 10:     end if |
| 11:     fnode←GetFuseNode(candidates) |
| 12:     candidates←pop(candidates,Sons(fnode)) |
| 13:     candidates←push(candidates; fnode) |
| 14: until fnode = NULL |
| 15: return selected |

The algorithm is based on the following procedure. The S most frequent symbols are selected and the rest of the symbols are summed in order to calculate the rest symbol R. If R is higher than the least frequent selected symbol $M_S$, it is considered that critical security information is being lost. In such case, the sum of the symbols belonging to rest R are fused in a generic symbol at a higher level, at the most suitable node. The election of the symbols to be fused is performed by the function GetFuseNode. When the node is fused, sons are removed from the available nodes list (candidates) since their father is included and thus, they are already incorporated. R and $M_S$ are calculated again and the procedure repeated until R is smaller than the least frequent selected symbol. Therefore, at this point we will finish with S symbols plus a last one composed of the symbols included within rest R. Although it is an extreme situation, if S is chosen too small the algorithm may sometimes finish unsuccessfully due to the lack of new fusing candidates.

Two values are calculated for each higher level fused symbol (GetFuseNode function)—the rate or number of samples summing his sons (importance) N and the rate M between N and the value of its son with fewer samples (importance). This second operation attempts to measure the highest amount of hidden information produced by the fusion. Thus, to select the node we must take into account the following factors related to the values N and M:

Fusing symbols with low N is a good approach since behaviour may be better modelled producing an increment in accuracy Fusing symbols with a low M is good in terms of security due to the fact that the least possible critical information is hidden.

A low N will increase the accuracy in the models, especially of legitimate use, but leaves out the evaluation of the amount of information hidden in the fusion. On the other hand, M attempts to consider the low rated sons that may be hidden in the fusion therefore, producing a security problem. One must reach a compromise between modelling habitual events and not losing strange or abnormal events. To obtain the rule to fuse, the following fusing value for each level is calculated and the smallest one is chosen $$Fv = \alpha N + \beta M$$

where $\alpha$ and $\beta$ are the respective chosen weights. We have decided to give more importance to the second factor to take into account low occurrence rate symbols. Therefore, the values for $\beta$ (0.8-0.95) normally are higher than $\alpha$ (0.05-0.2).

Figure 5B:
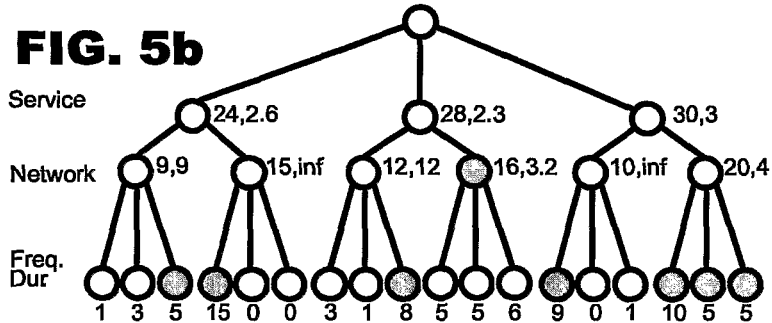
FIG. 5b represents the tree of FIG. 5a after a first fusion step of symbols as a function of the weight given to certain parameters.
Figure 5C:
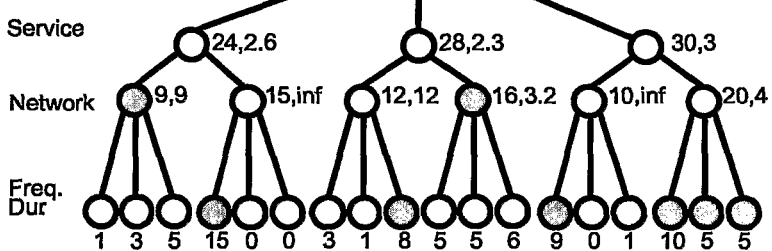
FIG. 5c represents the tree of FIG. 5a after a second fusion step of symbols as a function of the weight given to certain parameters.

Let us illustrate the algorithm applying HISA to the 82 examples shown in FIG. 5a where 18 symbols are possible but only 15 are found in the sampling dataset. Consider a decrease in the number of symbols until 9 remain. The values chosen in the example presented below are $\beta=0.1$ and $\alpha=0.9$. Firstly, as shown in FIG. 5b, we choose the highest eight (S1, . . . S8) among the real symbols (at the lowest level) and afterwards we fuse in a first step as shown in FIG. 5b, and in a second step as shown in FIG. 5c. After each fusion, the next most important real symbols at the lowest level are selected to maintain the total number of selected symbols at the chosen number of eight. In the following table 2, the values obtained are summarized:

TABLE 2

| $M_s$ | R | END ? ( R ≤ $M_s$ ) | Fusing Value |
|---|---|---|---|
| 5 | 19 | No | 3.2 × 0.9 + 16 × 0.1 = 4.48 |
| 5 | 9 | No | 4 × 0.9 + 20 × 0.1 = 5.6 |
|  |  |  | (Other: 9 × 0.9 + 9 × 0.1 = 9) |
| 3 | 3 | Yes | — |

After the symbols are built, modelling of user behaviour is performed by means of Hidden Markov Models (HMM), a machine learning algorithm, that is known per se, and that is used herein to codify aims and behaviours.

Figure 6A:
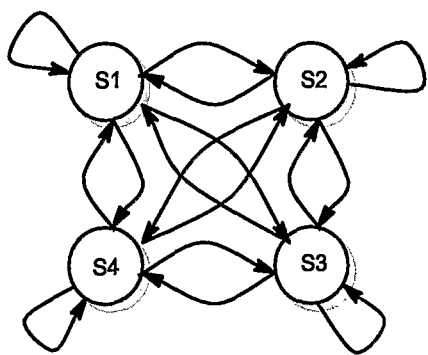
FIG. 6a is a representation of the possible transitions between four observable states.

By way of example, consider a networking scenario where two possible types of services and two kinds of IP groups are possible. Thus, four different service symbols (S1, . . . S4) can be observed in our situation. Therefore, in a Markov Chains model there will be sixteen possible transitions as shown in FIG. 6a. If one considers more possible states, for S services and N kinds of subnets, there will be $(SN)^2$ transition probabilities. For instance, a normal user can work with 8 services and medium network can be separated in three parts. The Markov Chains will have $(24)^2=576$ transitions to compute. These values are expensive to calculate accurately due to the large amount of training data needed to estimate properly all the probabilities. If the transitions are defined as between aims (Task A, Task B) instead of between services (S1, . . . S4), the number of them will be reduced. Some interesting properties may be also required:
  (i) After generating a connection two possible options are presented: remaining in the same aim or jumping to another.
  (ii) Each aim 1s more likely to only use certain services according to a set of specific probabilities. Some aims such as working on a project, operating on a remote computer or even some spare time generate specific connections with a different likelihood.
  (iii) These aims are hidden entities since there is not direct observation over them due to their abstract nature. However, it is quite intuitive that the number of aims behind a user cannot be very high, maybe only three or four.

Figure 6B:
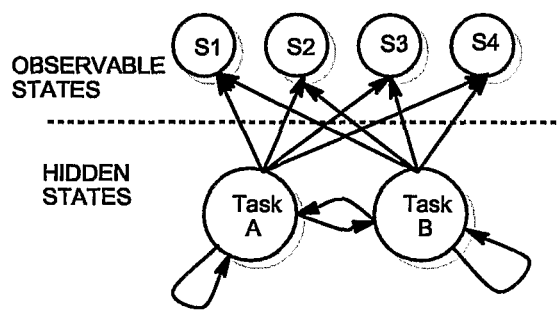
FIG. 6b is a representation of the possible transitions between hidden states (representing user aims) based on four observable states.

The three characteristics above are perfectly integrated in hidden Markov models due to the fact that a set of hidden states will generate, with a certain probability, a sequence of symbols. Transitions probabilities represent changes of aims while generation probabilities can be interpreted as reflections of the aims into connections. For the previous example with four possible symbols (S1, . . . S4) and assuming two aims (Task A, Task B) for this user, we could build the model shown in FIG. 6b. The transitions reduction can be calculated as follows. If we call SN the number of observable states and H are the number of hidden states, the number of transitions becomes $(SNH+H^2)$. In FIG. 6b, one has 12 transitions so the reduction of states is not really high but if we compare the case of 8 services and 3 networks with 3 hidden states there will be 72+9=81 states which is approximately 14% of the transitions we had with the simple Markov chain. We could even increase the complexity of the HMM adding new hidden states without adding many new transitions. The maximum number of hidden states H one needs to consider to reach the same number of transition values as in a Markov chain modelling to appreciate the important gain is obtained from the following relation:

$$H^2+SNH-(SN)^2=0 => H=(5^{0.5}-1)SN/2 \approx 0.62 SN$$

In order to measure the behaviour from different intervals of time, HMM offers a good framework since new training is not required. Once the model is built, the evaluation of sequences of different lengths can be accomplished without having to modify or retrain the model.

A further issue to address using HMM is how to adjust the model parameters to maximize P (O|λ) where P (O|λ) is the probability of having a sequence of connections as O, i.e. a behaviour coming from its model λ. This problem is the learning problem of a HMM model. When a model is trained, the goal is maximizing the similarity between the behaviour of the model and the one coming from the user. Once the model is built, new incoming behaviour must be compared to detect abnormalities. This is performed by computing P (O|λ), the probability of the observation sequence, given the observation sequence O and a model λ of behaviour. The value obtained will correspond to the probability of having this sequence of symbols generated by the model, in other words how likely this behaviour is regarding the model.

HMM can provide certain information about the level of normality in the user behaviour. However, the fact that anomalous activity such as an intrusion does not produce a known number of symbols, requires further consideration in the analysis of behaviour. For example, only one symbol may be enough to report abnormal or malicious activity, but sometimes some abnormal behaviour can only be detected by analysing the likelihood over long spans of time, for example several hours or even days of working. To address this problem, it is proposed to analyse behaviour from the following points of view in HMM user models:
  (i) Symbols abnormality: The likelihood of one symbol for a user will be evaluated by calculating P (Symbol I User1)≈P ($O_1$|λ), the abnormality in the connections.
  (ii) Long-term abnormality: If there is enough data, behaviour may be modelled for hours or even days, $O_{ST}<O<<O_{LT}$. This modelling will be more important for regular users of the computer system network.

Since the ADS system is network based and designed to operate in a wide range of environments, a new method for authenticating the user of every connection has been developed within the scope of this invention. As discussed above, authentication of users is needed to build the personal behaviour models and to perform behaviour comparison. It may be remarked that it would not suffice to model hosts, since various users may access the network through the same host and sometimes same user operates in different machines.

The method for authenticating users according to this invention involves an authentication module with following advantageous features:
  (i) It considers any kind of connection, even if it is not accomplished or totally established.
  (ii) It is lightweight, meaning that it is a single compact entity in the network that does not resort to external or intermediate files, and generates an inappreciable load in the system. Polling or continuous information requests are discarded.
  (iii) It is difficult discover and deactivate for an intruder since it operates at kernel level.
  (iv) It is fast when requesting information as well as sending authentication.
  (v) It has good portability with various operating systems: Unix and Windows architectures are currently supported.

Figure 7A:
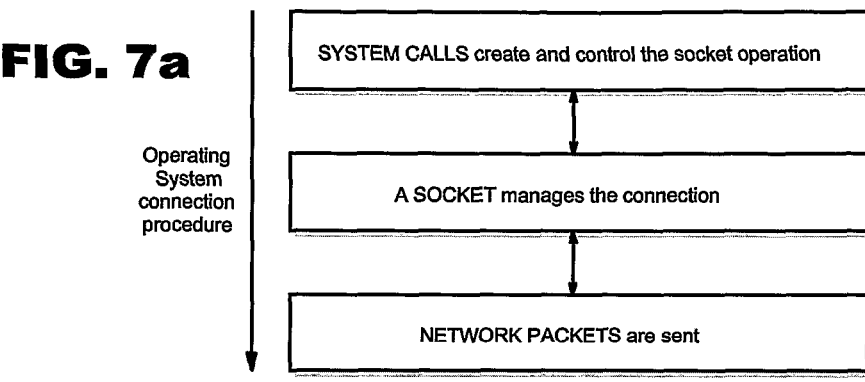
FIG. 7a is a flow chart illustrating the steps in an operating system connection procedure the specific example relating to UNIX systems, FIG. 7b are block diagrams representing the connection interaction between a user program and the operating system kernel in a conventional system and a system according to the invention respectively.
Figure 7B:
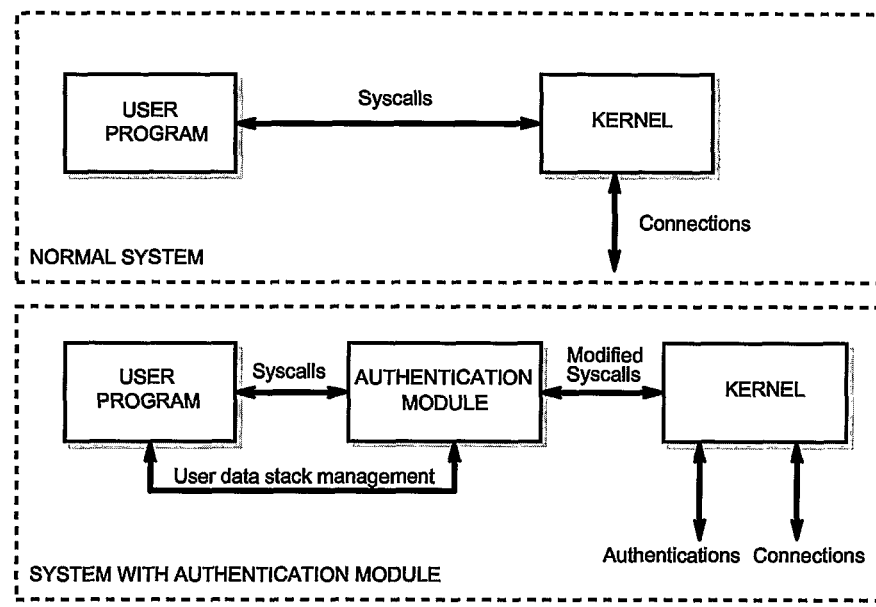
FIG. 7c is a flow chart diagram illustrating the connection interception steps performed by the authentication module according to the invention.
FIG. 7d is a flow chart diagram illustrating the connection interception steps performed by the authentication module according to another embodiment of the invention.
Figure 7C:
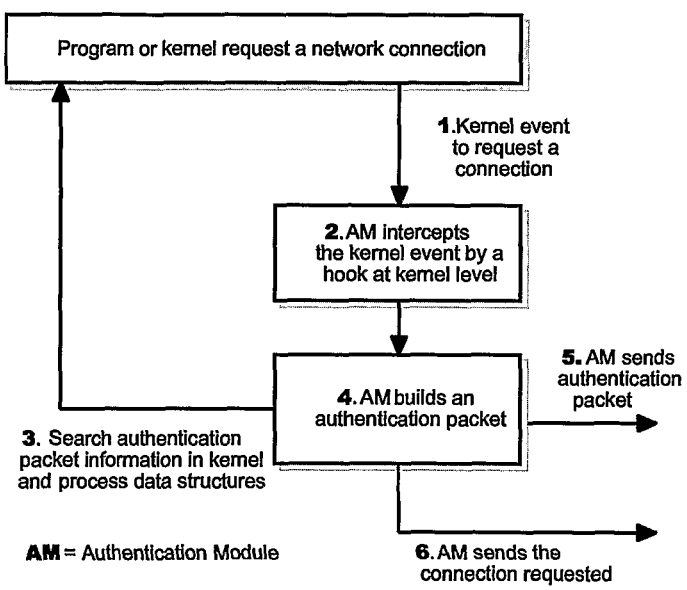

The general mechanism of operation of the authentication module as illustrated in FIG. 7c, involves the following steps:

(i) It intercepts certain kernel events when the user requests an IP connection, specifically:
   System calls in UNIX systems (through a hook inside the syscall table) such as Linux, Solaris, Aix, etc.
   Device drivers calls (more specifically it is a TDI driver) in windows-like operating systems such as Windows NT, Windows XP, etc.
   In Linux systems, it may be also achieved by implementing network level hooks (netfilters hooks) or classical device drivers.
(ii) When the call is captured, the authentication agent must look for user and application information consulting different sources, for example part of the information may be in kernel space (process information: application, user, etc.) or in user space (socket information, network packets, etc . . . )
(iii) The authentication module, working in kernel space, builds up an authentication packet with the information obtained. The authentication packet may be encrypted by any standard algorithm, for instance the algorithm known as Blowfish.
(iv) The module sends the authentication packet before the requested connection.
(v) The module sends the connection by means of emulating the same kernel events noted in point (i).

For example, in a Solaris-UNIX based system, the preceding five steps would be as follows:
(i) The user program requests some functionalities to the kernel by sending system calls. For some of them, which target the establishment of connections, the module will receive and wrap through a hook in the syscall table. The original petition will be slightly delayed to create and send the authentication packet.
(ii) The authentication module obtains the user and process information by accessing to the process data structure and copying the necessary data. Some information in user space as the connection information must also be copied.
(iii) The module builds up the authentication packet with the information extracted.
(iv) In order to send the authentication packet, the agent must introduce some information into the user data stack to emulate a set of new system calls. With this procedure, one not only ensures the accomplishment of the requested connection but one also makes the kernel send the authentication information. Therefore, the kernel receives the set of syscalls provided by the authentication module and generates the connection and the authentication. After that, the authentication module must remove the added extra user space and return the expected return value of the syscall to continue normal execution.
(v) The requested connection from the user is finally executed by executing the original captured system call.

The authentication information is generated by the kernel, from the protocol point of view, by using UDP packets to send the information to the platform due to the following reasons:
   It is light and fast and due to the short length in the authentication chain, it becomes enough as a container for the information.
   It is harder to detect since it is not connection oriented and no connection establishment is necessary.

Figure 7D:
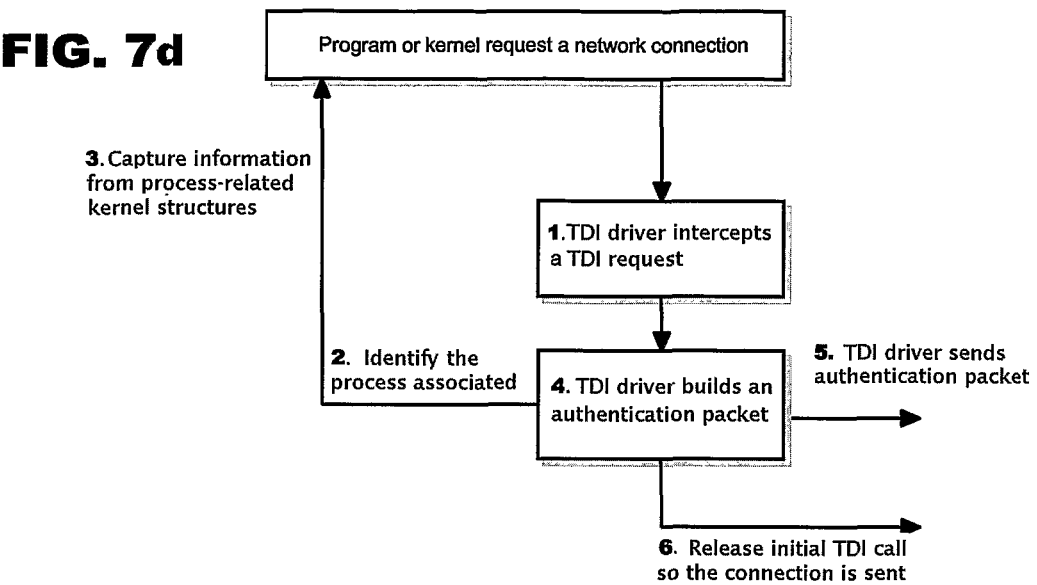

The connection authentication mechanism in windows-based operating systems comprises one or more drivers operating at kernel-mode. A typical scenario is a TDI filter driver carrying out the following basic sub-tasks as illustrated in FIG. 7*d*:

(i) Intercepting and blocking the TDI calls associated to network connections opened by any application running on the system;
(ii) Identifying the process associated to the TDI call;
(iii) Capturing information from the kernel process-related structures about the user and application binary context associated with such process;
(iv) Creating an authentication packet at kernel level and encapsulating as content the information shown in FIG. 8*a*;
(v) Sending the authentication packet through the standard OS network mechanisms;
(vi) Releasing the initial blocked TDI call so the original connection attempt goes on.

A similar approach following the above steps can be implemented with the help of a second NDIS filter. The primary goals of this second element are:
   to make sure an application is not executing a direct NDIS call without passing through the TDI driver
   to create the authentication packet at NDIS driver level
   to create a second authentication mechanism by directly injecting the authentication packet shown in FIG. 8*a* in the connection TCP headers, for instance in the TCP options field.

Figure 8A:
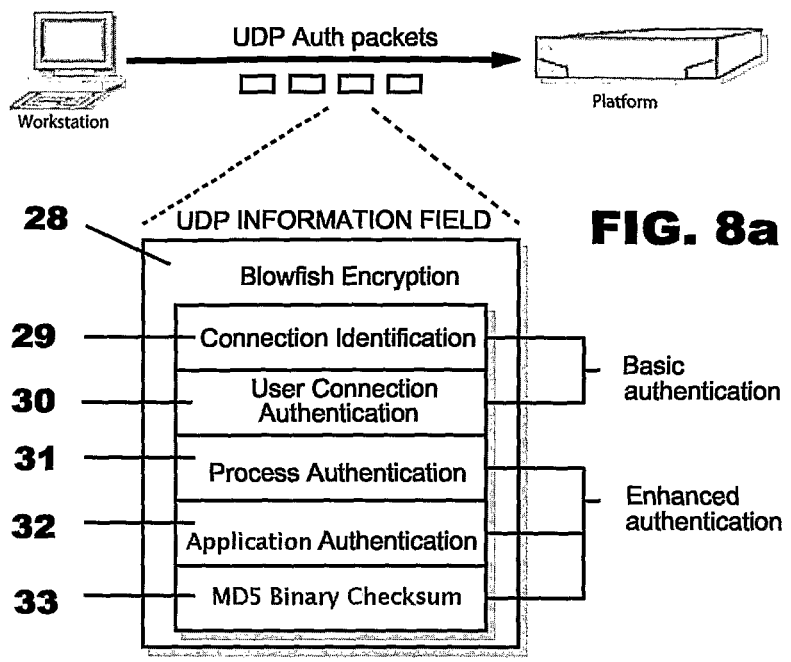
FIG. 8a is a schematic representation of the information field of UDP authentication packets according to this invention.

The authentication information travels within an authentication packet 28 as shown in FIG. 8*a*. In the information field of the packet, the first two fields are basic for the correct operation of our system but there are three other optional fields to improve the security of the connection. The five fields shown are:
(i) Connection identification 29: The IP connection identification is included with information on its five characteristic properties, i.e. both hosts, both ports and the protocol. The robustness of the method is enhanced since normally two or three properties would be enough to match them within this short period of timeout.
(ii) User connection authentication 30: The user identification label is sent in this field. In this embodiment, users are distinguished by their UID (User Identification) since it represents their real identity instead of users or aliases. Otherwise, the authentication might be IP+UID (Internet Protocol Address+User identification). The Administrator may also have the possibility to group several UIDS into one.
(iii) The process ID 31 is sent to ensure, for instance, the legitimate work of daemons in the system or to analyse if the connections are originated by different processes. The process ID may be a personal characteristic in root and maintainer UIDs.
(iv) Application authentication 32, which in the present embodiment is the command name which generates connections, is also sent.
(v) The application authentication (command name) is checked with the MD5 binary checksum 33 to corroborate binary integrity and check the correct version of the applications.

The authentication packet thus includes an enhanced mode with support for authentication of the process and application binary associated with every connection. The process authentication field 31 includes the running process identification while the application authentication field 32 and MD5 checksum deals with the application name and MD5 hash of the binary related to such application.

The enhanced authentication is a key element since it permits to have a real-time authentication of every application (name and binary) launching connections on a particular system.

To avoid malicious and fake authentications, UDP packets encryption is preferable. To do so, in the initialization of the system, a common pair of hashes is assigned to platforms and users and each communication must rely on this encryption. A "Man of the middle" attack is avoided since a previous exchange of the keys will be also encrypted by means of a default common and unknown hash.

Another important element to consider is the platform mechanism for matching connections and authentication module UDP packets separating the different user dataflows. This procedure will form the starting point to operate with network traffic already separated per user.

Figure 8B:
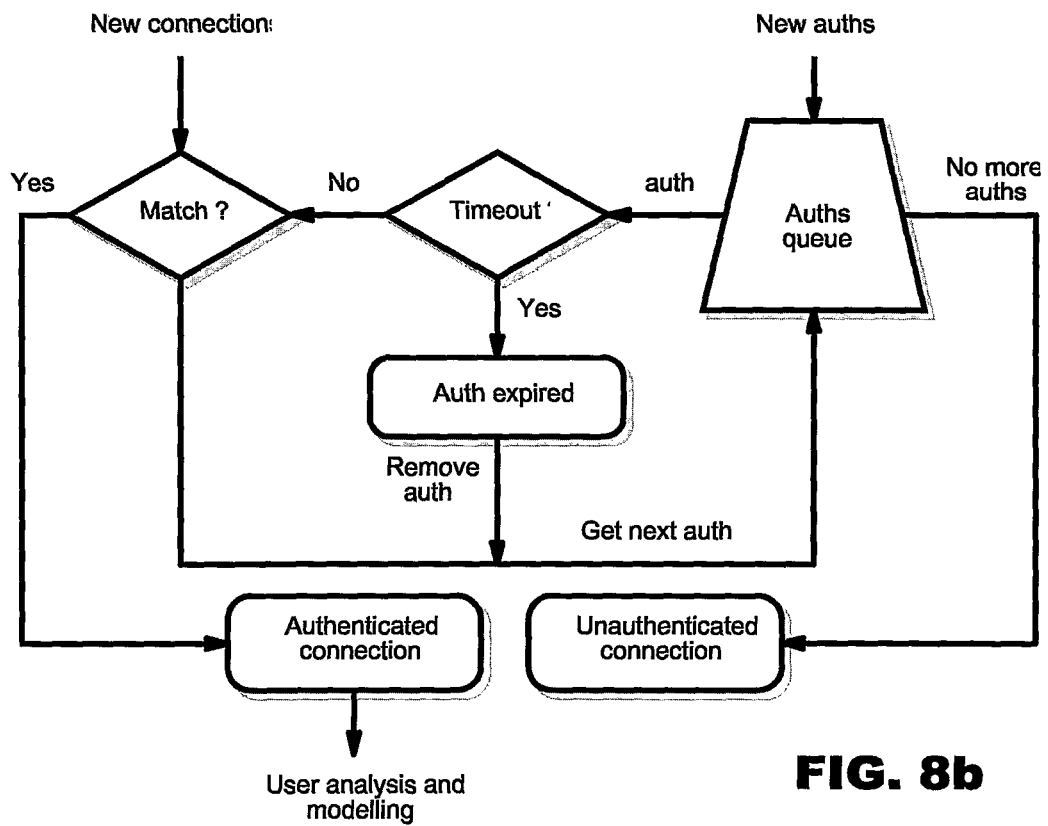
FIG. 8b is a schematic flow chart representation of the authentication operation of an authentication module of the invention ADS.

There are two main possibilities for this matching: (i) one can first receive the authentication module packet, or (ii) one can first receive the connection. The choice of either approach must be reflected in the implementation of the authentication module, in which the main points are summarized as follows:

In the first approach, which is illustrated in FIG. 8b, the authentication module packet is first received and the posterior connection will attempt to match these stored authentications. After a reasonable period of time the authentication will expire. This approach offers some important advantages such as having a certain time interval to assess the connection processing and react before it will be established.

In the second approach, connections are stored waiting for the authentication packet to arrive and match them. In this process the authentications without an associated connection are discarded. Although it may save space in the system, one has the risk of having short period of time with unauthenticated connections operating in the protected network. Other technical considerations such as deploying an offline mode make this approach less efficient than the first to operate in real environments.

The preferred approach is the first, mainly due to the possibility of stopping abnormal connections early. Moreover, due to the system network-based architecture, unauthenticated connections are always noticed by the system.

In the overall design of the invention IDS, the main technical considerations that have been taken into account include the following:

(i) Connection related technical considerations
  Realtime operation.
  Fragmentation support avoiding most known anti-IDS hacker techniques.
  First packet detection. It adds support for SYN, RST, XMAS or NULL scanning and other kind of methods based on abnormal connections.
  High availability system reducing the possibility of IDS overflowing.
  Easy support for ICMP and UDP.
  Fast low level connection treatment.
(ii) User modeling related technical considerations.
  Realtime modelling and testing.
  Interdependency between user algorithms and data structures in order to add mobility.
  Fast modelling using low level coding.
  Sleep mode in modelling inactive users to save resources and being able to deal with more users simultaneously.
(iii) Security administrator related technical considerations.
  Realtime displaying.
  Intuitive graphical interface.
  Explanations and risk assessment.
  Offline and analysis mode.

Figure 9:
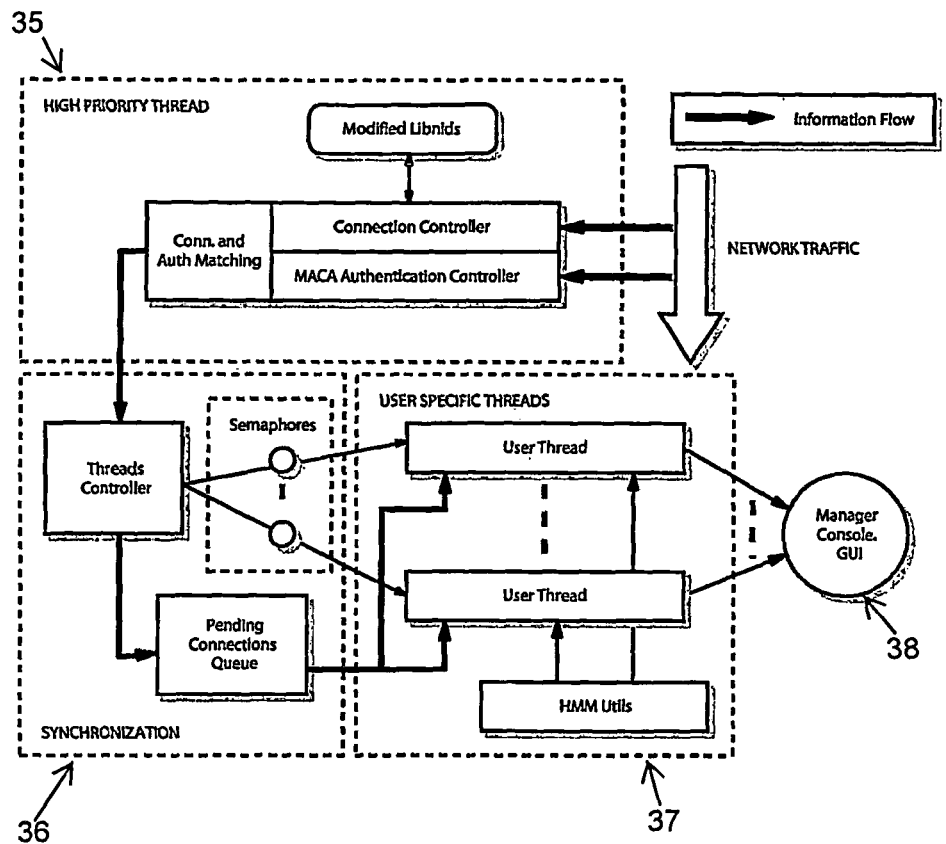
FIG. 9 is a schematic block diagram showing the main functional parts of the invention ADS.

FIG. 9 illustrates an example of the invention ADS deployment, which comprises the following main functional components:

A high priority thread 35: This block is deployed with the main aim of offering a high degree of availability to incoming new connections. Each one of them must be analysed and quickly passed to the synchronization thread with the minimum processing delay. To do so, the maximum available CPU time is assigned to this thread in order to attend every connection even in high load environments. A modified version of libnids enables a fragmentation reassembly and a stricter TCP control. The authentication and matching procedure showed in FIG. 8b will also be carried out in this high priority thread where the output is authenticated connections.

Synchronization block 36: The synchronization between incoming connections and user thread will be done in this part of the system. Here, new incoming authenticated connections are quickly pushed into a queue sorted by idle time. Then, the connection will be processed by their respective user threads. When a new connection arrives to this section, after being introduced in the stack the threads controller decides where to put it or whether it is necessary to create a new thread. Then, a set of semaphores deal with the communication between the controller and the user threads to indicate them the existence of new connections.

User thread 37: Each user model is isolated in a independent thread. When they receive new information through semaphores about waiting connections, they extract them from the pending connection queue and the analysis starts. In these User threads the Services, Symbols and HMM are built. When the likelihood for each new symbol is obtained, all the information is sent to the console management located in a separated and isolated thread.

Console management 38: A GUI (graphical user interface) displays all the information processed about the new event. New parameters of modelling and historical results are also shown. In the case of abnormal events, some explanations about the anomaly context are commented. The main features of the graphical interface, which is for example deployed in a friendly environment using GTK+ libraries, are:
  Support for displaying host and user modelling.
  Detailed service information.
  Control of the global variables (threads, number of connections . . . ).
  Modelling in low, medium and short term.
  Symbols information.
  Evolution graphics for every behaviour.
  Simple color danger reporting.
  Explanations visualization.

Figure 10A:
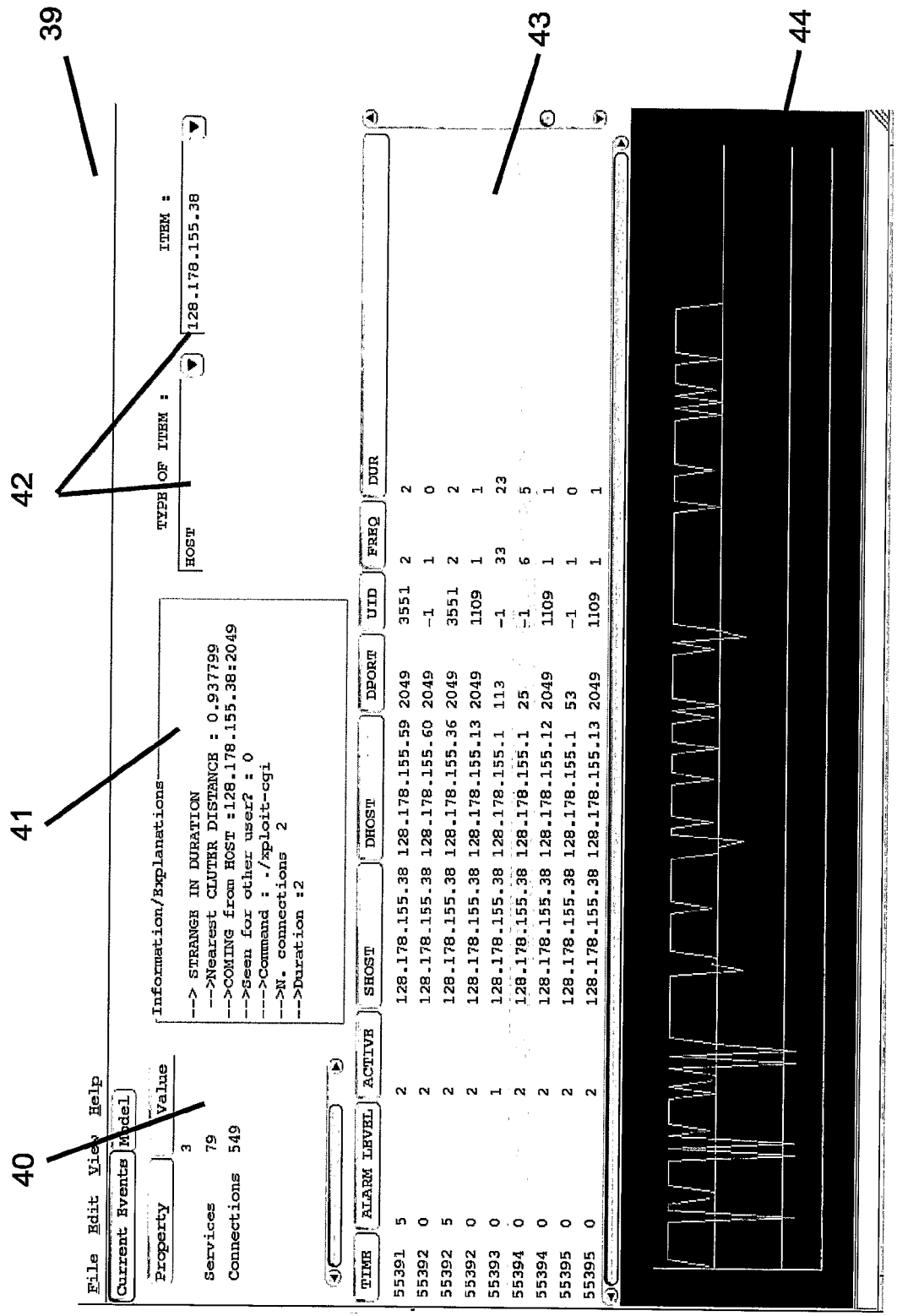
FIG. 10a is a screen shot of a GUI showing an example of a current events window of the ADS according to this invention.

The console may be provided with a current events window 39 as illustrated in FIG. 10a, in which two main windows display the overall view and the modelling information. The main parts in this window are:
  The general properties window 40. It provides information about the number of threads, connections and services in the platform for the whole set of users.
  Information/Explanation window 41. A set of explanations about the connections indicating the cause of the level of anomaly are provided, as well as the some service information.
  Target election window 42. The target to be visualized may be chosen. There is support for displaying all of them together.
  Service information window 43. Detailed information about the services features is provided. Services, for example with letters in blue, are still active. Information about the user is also included. The level of danger can be shown in colors, for example green, yellow or red, to improve visual detection.

Normality graphic window 44. A sliding graphic shows the levels of normality extracted from the HMM analysis for each new incoming service. The abnormal ones are indicated for example with a vertical line in red.

Figure 10B:
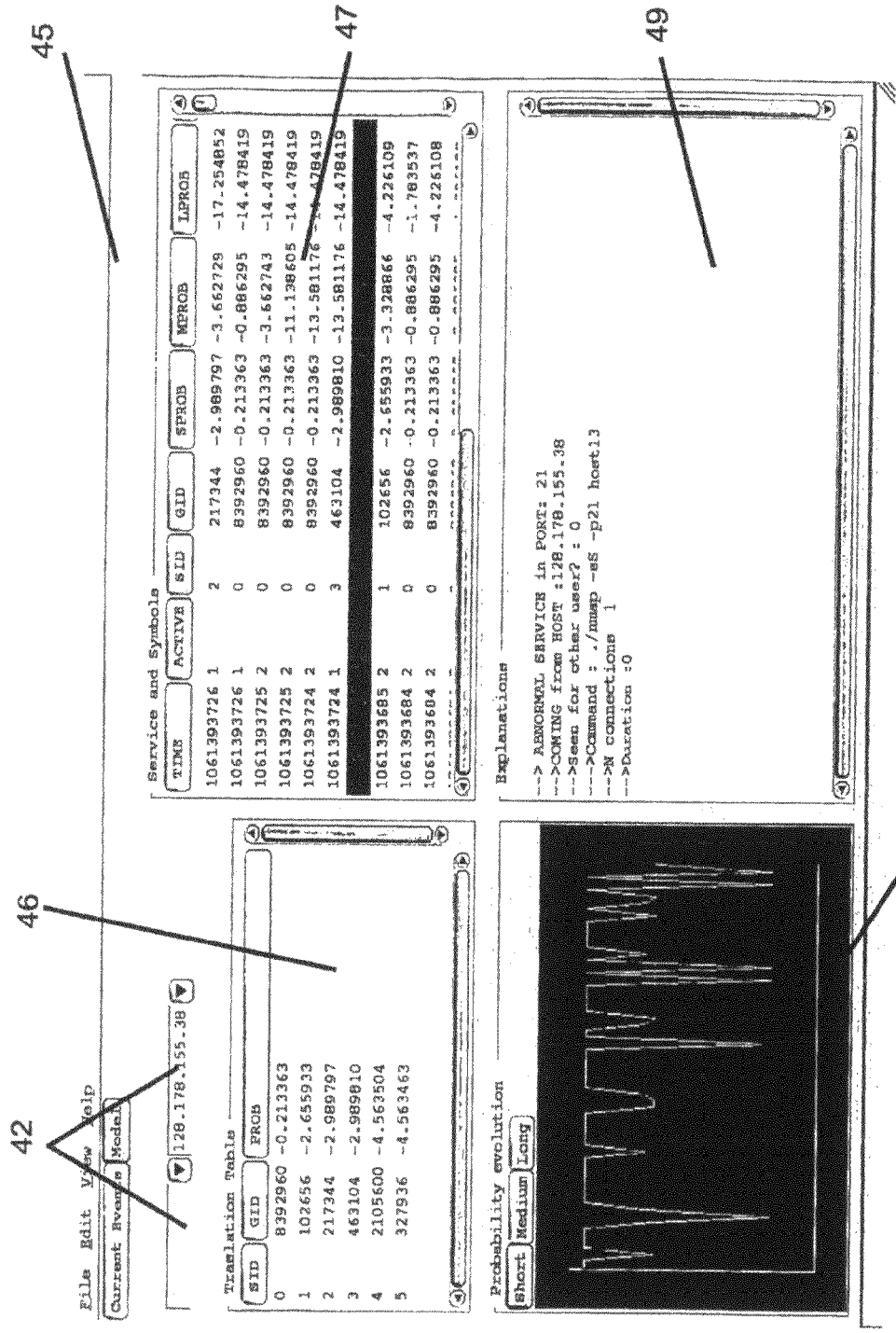
FIG. 10b is a screen shot of a GUI showing an example of a user modelling window of the ADS according to this invention.

The console may further comprise a modelling window 45, as illustrated in FIG. 10b, to inform about the detailed evolution of user models. Symbols and probabilities are shown in this window in order to offer a friendly and quick analysis tool to the administrator. The main components of the modelling window are:

Target election window 42. The target to visualize can be selected.

Translation table 46. The symbols used by a selected User may be observed. Internally, each symbol has a general identification denoted as GID while in the modelling they are named as SID symbols. The logarithmic probabilities of occurrence according to the model for each user is also included in this window.

Service and symbols window 47. All the information of the symbols for each service is displayed here. Short, medium and long term probabilities are also presented.

Probability evolution graphic 48. A graphical evolution for the probability of normality for the selected user in several terms is displayed.

Explanation window 49. Similar to the current events window, explanations about the events by means of HISA consulting are provided. A logical analysis and some results are displayed here.

The invention claimed is:

1. Method of detecting anomalous behavior in a computer network comprising the steps of:
monitoring network traffic flowing in a computer network system,
authenticating users to which network packets of the network traffic are associated, comprising receiving kernel events requesting a connection, modifying the kernel events, transmitting the modified kernel events to a kernel of the operating system, generating connection and authentication information in the kernel, and sending authentication packets containing the authentication information and connection request information to an anomaly detection system in the computer network,
extracting parameters associated to authentication packets for each user, said parameters including at least a type (T) of network services, and a network internet protocol group (N) being addressed,
forming symbols based on a combination of one or more of said parameters, wherein at least some said symbols are based on a combination of a plurality of said parameters, and
modeling and analyzing individual user behavior based on sequences of occurrence of said symbols (S).

2. Method according to claim 1, wherein the parameters extracted include a frequency (F) of connections in a service.

3. Method according to claim 2, wherein the parameters extracted include a duration (D) between first and last connection in a service.

4. Method according to claim 3, wherein the parameters of frequency (F) and duration (D) of user services are quantified with either a fixed step quantification algorithm or a K-means clustering algorithm.

5. Method according to claim 1, wherein the parameters extracted include a period of day and a number of bytes.

6. Method according to claim 1, wherein each different combination of parameters extracted forms a different symbol.

7. Method according to claim 1, wherein user behavior is modeled by modeling the sequences of symbols (S) using Hidden Markov Models (HMM).

8. Method according to claim 1, wherein the symbols are classified in a form of a hierarchical tree of decreasing importance, where a highest level includes generic symbols for each type of service with any value in network internet protocol group, frequency and duration, a next lower level includes a type of network internet protocol group with any value in frequency and duration and subsequent levels correspond to symbols including frequency and duration.

9. Method according to claim 8, wherein a number of symbols are reduced by selecting an S most frequent symbols at a lowest level and summing a rest of the symbols at the lowest level to form a rest symbol value R.

10. Method according to claim 9, wherein, if a value of the rest symbol R is greater than a value $M_s$ of a least frequent selected symbol, symbols are fused to a next higher level.

11. Method according to claim 1, wherein the type of network service parameter (T) is derived from a logical port.

12. Anomaly detection system comprising an authentication module and anomaly detection system platform installed and deployed in a protected computer network system and configured to
monitor, with a computer, network traffic flowing in a computer network system,
authenticate, with a computer, users to which network packets of the network traffic are associated by means of the authentication module, comprising receiving kernel events requesting a connection, modifying the kernel events, transmitting the modified kernel events to a kernel of the operating system, generating connection and authentication information in the kernel, and sending authentication packets containing the authentication information and connection request information to the anomaly detection system platform,
extract, with a computer, parameters associated to authentication packets for each user, said parameters including at least a type (T) of network services, and a network internet protocol group (N) being addressed,
form, with a computer, symbols based on a combination of one or more of said parameters, wherein at least some said symbols are based on a combination of a plurality of said parameters, and
model and analyze, with a computer individual user behavior based on sequences of occurrence of said symbols (S).

13. System according to claim 12, wherein the authentication module is deployed within a high priority thread to which maximum available central processing unit time is assigned.

14. System according to claim 12, further comprising a synchronization functional block for controlling and organizing incoming connections into corresponding User threads.

15. System according to claim 14, further comprising a User thread functional block for generating User models from isolated independent User threads received from the synchronization functional block.

* * * * *